(12) United States Patent
Spies et al.

(10) Patent No.: US 7,103,911 B2
(45) Date of Patent: Sep. 5, 2006

(54) IDENTITY-BASED-ENCRYPTION SYSTEM WITH DISTRICT POLICY INFORMATION

(75) Inventors: Terence Spies, Palo Alto, CA (US); Matthew J. Pauker, San Francisco, CA (US); Lucas C. Ryan, San Francisco, CA (US); Guido Appenzeller, Menlo Park, CA (US)

(73) Assignee: Voltage Security, Inc., Palo Alto, CA (US)

( * ) Notice: Subject to any disclaimer, the term of this patent is extended or adjusted under 35 U.S.C. 154(b) by 295 days.

(21) Appl. No.: 10/688,019

(22) Filed: Oct. 17, 2003

(65) Prior Publication Data

US 2005/0084100 A1    Apr. 21, 2005

(51) Int. Cl.
G06F 11/30 (2006.01)
G06F 12/14 (2006.01)
H04L 9/00 (2006.01)
H04L 9/32 (2006.01)
H04K 1/00 (2006.01)

(52) U.S. Cl. .......................... 726/3; 713/156; 713/175; 380/277; 380/278; 380/279

(58) Field of Classification Search .................. 726/14, 726/3; 713/150, 168, 170, 156, 175; 380/282, 380/277–279
See application file for complete search history.

(56) References Cited

U.S. PATENT DOCUMENTS

| 5,016,276 | A | 5/1991 | Matumoto et al. |
| 5,159,632 | A | 10/1992 | Crandall |
| 5,271,061 | A | 12/1993 | Crandall |
| 5,272,755 | A | 12/1993 | Miyaji et al. |
| 5,581,616 | A | 12/1996 | Crandall |
| 6,061,448 | A | 5/2000 | Smith et al. |
| 2002/0076042 | A1 | 6/2002 | Sandhu et al. |
| 2003/0081785 | A1 | 5/2003 | Boneh et al. |
| 2003/0115448 | A1* | 6/2003 | Bouchard .................... 713/153 |
| 2003/0120733 | A1* | 6/2003 | Forman ....................... 709/206 |

(Continued)

FOREIGN PATENT DOCUMENTS

WO    WO 02/51066 A1    6/2002

OTHER PUBLICATIONS

Jeremy Horwits and Ben Lynn, "Toward Hierarchical Identity-Based Encryption," Advances in Cryptology: EUROCRYPT 2002, Lecture Notes in Computer Science, vol. 2332, pp. 466-481, 2002.

(Continued)

*Primary Examiner*—Ayaz Sheikh
*Assistant Examiner*—Shin-Hon Chen
(74) *Attorney, Agent, or Firm*—G. Victor Treyz

(57) ABSTRACT

A system is provided that uses identity-based encryption (IBE) to allow a sender to securely convey information in a message to a recipient over a communications network. IBE public key information may be used to encrypt messages and corresponding IBE private key information may be used to decrypt messages. The IBE private keys may be provided to message recipients by an IBE private key generator. The IBE private key generator and the recipients who obtain their IBE private keys from that generator form a district. District policy information may be provided by the IBE private key generator that specifies which encryption and communications protocols are used by the district. The district policy information may also specify which authentication protocols are used by the district and may set forth how content-based protocols are implemented. This information may be used by senders in sending messages to recipients.

21 Claims, 9 Drawing Sheets

U.S. PATENT DOCUMENTS

2003/0179885 A1* 9/2003 Gentry et al. ............... 380/277
2003/0182554 A1   9/2003 Gentry et al.
2003/0204722 A1* 10/2003 Schoen et al. ............. 713/156
2004/0139314 A1* 7/2004 Cook et al. ................. 713/151
2004/0162879 A1* 8/2004 Arcuri et al. ............... 709/206
2005/0015449 A1* 1/2005 Klos et al. ................. 709/206
2005/0102512 A1* 5/2005 Goh et al. .................. 713/168

OTHER PUBLICATIONS

Xuejia Lai and James L. Massey, "A Proposal for a New Block Encryption Standard," Advances in Cryptology—EUROCRYPT '90, pp. 389-404, Proceedings, LNCS 473, Springer-Verlag, 1991.

* cited by examiner

|  |  |
|---|---|
| SUBDISTRICT 1 IBE PUBLIC PARAMETER INFORMATION | DISTRICT POLICY INFORMATION FOR SUBDISTRICT 1 |
| SUBDISTRICT 2 IBE PUBLIC PARAMETER INFORMATION | DISTRICT POLICY INFORMATION FOR SUBDISTRICT 2 |
| SUBDISTRICT 3 IBE PUBLIC PARAMETER INFORMATION | DISTRICT POLICY INFORMATION FOR SUBDISTRICT 3 |
| ⋮ | ⋮ |

FIG. 7

IDENTITY-BASED-ENCRYPTION SYSTEM WITH DISTRICT POLICY INFORMATION

BACKGROUND OF THE INVENTION

This invention relates to cryptographic systems, and more particularly, to identity-based-encryption systems.

Cryptographic systems are used to provide secure communications services such as secure email services and secure content distribution services. In providing these services, various messages must be securely conveyed between different parts of the system. For example, in a secure email system, a secure email message must be conveyed from a sender to a recipient. In secure content distribution environments, a service provider may distribute media files to subscribers in the form of encrypted messages.

With symmetric key cryptographic systems, the sender of a message uses the same key to encrypt the message that the recipient of the message uses to decrypt the message. Symmetric-key systems require that each sender and recipient exchange a shared key in a secure manner.

With public-key cryptographic systems, two types of keys are used—public keys and private keys. Senders may encrypt messages using the public keys of the recipients. Each recipient has a private key that is used to decrypt the messages for that recipient.

One public-key cryptographic system that is in use is the RSA cryptographic system. Each user in this system has a unique public key and a unique private key. A sender may obtain the public key of a given recipient from a key server over the Internet. To ensure the authenticity of the public key and thereby defeat possible man-in-the-middle attacks, the public key may be provided to the sender with a certificate signed by a trusted certificate authority. The certificate may be used to verify that the public key belongs to the intended recipient of the sender's message. Public key encryption systems such as the RSA system that use this type of traditional approach are referred to herein as PKE cryptographic systems.

Identity-based-encryption (IBE) systems have also been proposed. As with PKE cryptographic systems, a sender in an IBE system may encrypt a message for a given recipient using the recipient's public key. The recipient may then decrypt the message using the recipient's corresponding private key. The recipient can obtain the private key from a private key generator associated with the recipient.

Unlike PKE schemes, IBE schemes generally do not require the sender to look up the recipient's public key. Rather, a sender in an IBE system may generate a given recipient's IBE public key based on known rules. For example, a message recipient's email address or other identity-based information may be used as the recipient's public key, so that a sender may create the IBE public key of a recipient by simply determining the recipient's email address.

In addition to or instead of using identity-based information, more generally applicable policy-based information may be used to form the IBE public key. As an example, a one-week expiration period may be imposed on all encrypted messages. This expiration date policy may be used to form the IBE public key (e.g., by basing the IBE public key on a date stamp). As another example, a ratings policy might specify that only subscribers greater than a certain age may access the content of the message. The rating value associated with a given message may be used to form the IBE public key for that message. Recipients must satisfy the policy constraints set forth in the IBE public key before they can access the encrypted message content.

Although senders of IBE-encrypted messages need not look up a recipient's public key as with PKE schemes, senders must obtain so-called IBE public parameter information that is associated with the recipient's IBE private key generator. The IBE public parameter information is used as an ancillary input to the sender's IBE encryption algorithm and works in conjunction with the IBE public key of the recipient to ensure that the message is encrypted properly.

To create the IBE public parameter information and IBE private keys of its associated recipients, an IBE private key generator must use secret information (called the "master secret s"). The security of the encrypted messages associated with this IBE private key generator rests on the ability of the IBE private key generator to maintain the secrecy of the master secret. Message security also depends on the measures taken by the IBE private key generator to authenticate a recipient before providing that recipient with an IBE private key. To maintain control over these aspects of system security, some organizations may want to maintain their own IBE private key generators.

In an environment with multiple IBE private key generators, the operators of the different IBE private key generators may not want to operate their systems identically. For example, one IBE private key generator may want to authenticate its users with a higher level of authentication than another IBE private key generator. Different IBE private key generators may also want to support different communications protocols or have other customized settings.

It is therefore an object of the present invention to provide ways in which to support IBE communications in an environment in which different IBE private key generators and other parties in the system have different operating needs.

SUMMARY OF THE INVENTION

In accordance with the present invention, an identity-based-encryption (IBE) system is provided in which IBE private key generators may be organized in districts. A message sender may use the IBE public key of a recipient to encrypt a message for the recipient. Each district may have an IBE private key generator that dispenses IBE private keys to an associated group of recipients. The recipients can use the IBE private keys in decrypting IBE-encrypted messages from senders.

Each district may have associated policy information that describes the policies and protocols for the district. The district policy information may provide message senders with details on the encryption and communications protocols used by the district. The district policy information may also include details on the authentication procedures used by the district to authenticate its associated recipients. Information on content-based policies may also be included in the district policy information.

A sender of a message may use the district policy information associated with a recipient's district to determine whether to send a given message to the recipient. If the message is to be sent, the sender may also use the district policy information to determine how to format the message, how to encrypt the message, etc.

Senders may use client processes (messaging applications) to send messages to recipients. The client processes at the senders may use the district policy information and client-based policy information in determining whether to send a message to a recipient. External data (e.g., information on the current date and time), message information (e.g., information on the content of a message to be sent), and recipient information (e.g., information on the email address or identity of a recipient) may also be taken into account by the client process when sending a message to a recipient.

Districts may be organized into multiple subdistricts, each having a different associated IBE private key generator. The recipients associated with each subdistrict may be mutually exclusive or may overlap.

When a sender is sending a message to a recipient that contains sensitive content or content of a particular type, the sender may be presented with notices. For example, the sender may be informed that a particular type of message cannot be sent to a particular district, because the security procedures at the district are insufficient to allow the messages to be sent. The sender's client process can use the district policy information to determine how to handle such messages. If a recipient is associated with multiple subdistricts, the client process can attempt to locate a suitable subdistrict to send the message to.

Further features of the invention, its nature and various advantages will be more apparent from the accompanying drawings and the following detailed description of the preferred embodiments.

BRIEF DESCRIPTION OF THE DRAWINGS

FIG. 7 is a diagram showing how a district may have multiple subdistricts each of which has associated district policy information in accordance with the present invention.

DETAILED DESCRIPTION OF THE PREFERRED EMBODIMENTS

Figure 1:
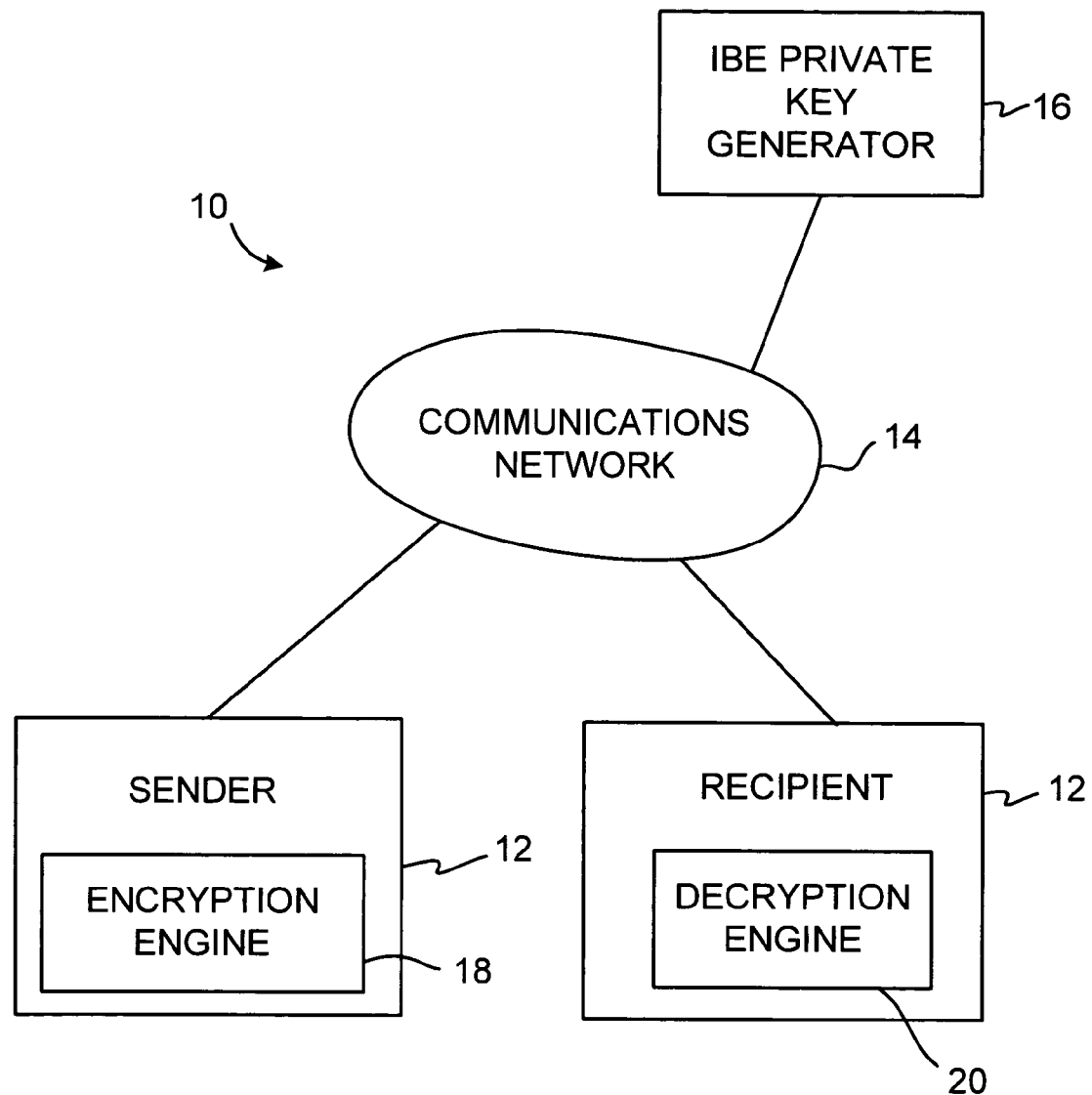
FIG. 1 is a diagram of an illustrative identity-based-encryption system in accordance with the present invention.

An illustrative identity-based-encryption (IBE) system 10 that may be used to support secure messaging is shown in FIG. 1. A user may send a secure message to one or more other users over a communications network 14. The users in the systems described herein may be individuals, organizations, parts of organizations, or any other suitable parties or entities. Users who are sending messages are called senders. Users receiving messages are called recipients. The messages may include any digital information (e.g., text, graphics, audio, video, commands, executable code, data, etc.) that it is desired to convey electronically between senders and recipients in a secure manner.

Users may communicate with each other using equipment 12. Equipment 12 may, for example, include computing equipment such as a personal computers, portable computers, mainframe computers, networked computers or terminals, telecommunications equipment, handheld computers or personal digital assistants, or cellular telephones. Multiple individuals or organizations may use the same device. For example, a group of workers in an office may share the use of a single computer terminal that is connected to a host computer in a local area network. In some environments, the senders and recipients may use router equipment or other such network equipment to send and receive messages related to network set-up and maintenance. These are merely illustrative examples of the type of platforms that system 10 may use. Equipment 12 may be based on any suitable electronic equipment if desired.

The equipment of FIG. 1 may be interconnected by communications paths in a communications network 14. Network 14 may be, for example, the Internet, a local area network, a wide area network, the public switched telephone network, a virtual private network, a wired network, a wireless network, a network including dedicated leased lines, a network based on fiber-optic or cable paths or other wired or wireless paths, or a network formed using any other suitable network technology or a combination of such networks.

System 10 can have multiple IBE private key generators 16. Only one private key generator 16 is shown in FIG. 1, to avoid complicating the introductory portion of the description of the system. Aspects of the system that relate to the use of multiple IBE private key generators 16 are discussed in more detail below.

Various computing devices may be used with network 14 to support secure messaging features. The location of such computing equipment (i.e., whether the computing equipment is considered to be within or part of network 14 or is considered to be connected to network 14 from another location) is generally not critical. For example, computing equipment may be used to implement the functions of a server or other computer equipment at each IBE private key generator 16. Servers may also be used to support the functions of an IBE public parameter directory, an IBE public parameter host, a certificate authority, or other entities. Such servers may be co-located with a sender, may be connected to the network 14 as an independent third party service, may be part of the infrastructure of network 14, may be associated with a given recipient's organization, may be co-located with the recipient, private key generator, or other equipment, or may used at more than one of these locations. These are merely illustrative arrangements which need not be mutually exclusive.

A server may be formed using a single computer or multiple computers. Multiple servers may be implemented on one computer. If desired, the functions of a single server may be provided by computers that are distributed over a number of different physical locations. The functions implemented using servers in system 10 may generally be performed using other computer equipment configurations if desired, but the computing equipment for implementing these functions is generally referred to as a "server" or "servers" for clarity.

A sender may send a message to a given recipient over system 10 using any suitable messaging format. For example, an email message, an instant message (e.g., an AOL instant message, a Yahoo instant message, an MSN Messenger instant message, and ICQ instant message, an IBM/Lotus Sametime instant message, etc.), or other electronic messages (e.g., messages sent between network equipment such as ICMP messages or messages sent between corporate IT systems, etc.) may be sent. Email messages may be used in contexts in which the widespread acceptance of the standard email format is important. Instant messages are generally limited in size, but may be delivered with less delay (e.g., less than a second) than email messages (which are typically delivered in less than one minute). Most instant messages are currently transported using insecure protocols.

Messages may be used to securely distribute digital content such as video and audio multimedia content from a service provider to various users in the system. The users may, for example, be subscribers to a service offered by the service provider. In this type of environment, the service provider is a sender of messages (e.g., encrypted movies and songs) and the subscribers are message recipients.

For clarity, the present invention is sometimes described in the context of particular types of messages (e.g., email messages or movie files). These are merely illustrative messages. Any suitable type of messages may be conveyed between senders and receivers if desired.

Some user activities in system 10, such as sending person-to-person email messages, involve at least some manual intervention. For example, a person who desires to send a personally-composed text message must type the message before it is encrypted and sent to the appropriate recipient.

Other user activities in system 10 may be entirely automated so that no human intervention is generally required. As one example, the user at one device 12 may be a banking institution that desires to use encrypted communications to deliver encrypted bank statements to account holders at other devices 12 over communications network 14. The statement preparation and distribution processes may be automated so that no operator intervention is generally needed at the banking institution's equipment once the system has been properly set up. User receipt of the statements may also be automated. As another example, devices 12 may be routers or other network equipment devices that autonomously exchange messages related to network setup and maintenance operations. In this scenario, the routers (or the parts of the network associated with the routers) serve as the senders and recipients in the system.

System functions involved in presenting on-screen options for humans to respond to (e.g., by clicking on them using a computer mouse) can be automated using software running on the components of the system. When a particular function may involve manual intervention or a computer-implemented operation will be clear from context in the following discussion.

During certain operations of system 10, certain entities (e.g., private key generators such as private key generator 16) may need to verify that a given party has permission to access the contents of a particular message or to perform certain functions. In general, the entity performing such authentication and authorization processes may use any suitable manual or automatic techniques. For example, a party may be asked to fax or mail a letter to an authenticating entity on the party's official letterhead, which is examined for authenticity by personnel or automated equipment at the authenticating entity. As another example, biometric identification techniques (e.g., fingerprint analysis, eye-scanning, handprint or voiceprint analysis, facial recognition methods, or in-person identification checks) may be used. Hardware-based arrangements (e.g., based on hardware tokens) may be used to establish identity. A user may provide credentials in the form of a pre-established user name and password. Certificate authorities may create digital certificates that help to verify the identities of certain parties. Digital signatures (e.g., signatures from a certificate authority or other entity that use PKE private keys and that can be verified using matching PKE public keys) may be used to ensure that a message or other signed information is associated with a particular party.

Sometimes authentication information and other information (in addition to the messages being sent from the senders to the recipients in system 10) such as IBE public and private keys must be conveyed between parties securely (e.g., between a sender and a private key generator or between a recipient and a private key generator, etc.). A number of different approaches may be used to convey information over network 14 securely. For example, information may be conveyed securely over a secure communications path such as a communications path that uses the secure sockets layer protocol (SSL) or other suitable secure protocol (e.g., TLS), a communications path may be trusted because it is under the control of a trusted party (e.g., the communications path may be physically under the control of a trusted party), and information may be conveyed securely by encrypting the information (e.g., in a message) before sending it over an insecure (or secure) link.

The operation of system 10 may involve the use of traditional public-key encryption cryptographic techniques such as used with RSA public-key cryptography. For example, the secure sockets layer protocol, which may be used to secure communications between parties when a web browser or other application is used, involves the use of certificates from trusted certificate authorities. Digital signatures can also be implemented using traditional public-key encryption techniques. These traditional public key cryptographic techniques are referred to herein as "PKE" cryptographic techniques.

The operation of system 10 also uses identity-based encryption (IBE) cryptographic techniques. These cryptographic techniques are referred to herein as "IBE" cryptographic techniques.

PKE and IBE encryption schemes use an asymmetric approach. Some information (so-called public key information) is used to encrypt messages. Other corresponding information (so-called private key information) is used to decrypt the encrypted message.

To enhance the efficiency of the IBE decryption and encryption processes, "two-step" decryption techniques may be used in which a message key (e.g., a symmetric message key) is used to encrypt the contents of a message prior to transmission to the recipient. The IBE process may then be used to encrypt the symmetric message key. The message that is sent from the sender to the recipient contains the IBE-encrypted message key and the message-key-encrypted message contents. At the recipient, the recipient can use the IBE private key to decrypt the message key. The message key may then be used by the recipient to decrypt the rest of the message. These two-step processes may be more efficient than "pure" or "single step" IBE encryption algorithms in which the IBE algorithm alone is used to encrypt the entire message. Both types of approaches (and analogous multi-layer IBE encryption approaches) are often generally referred to herein as simply "IBE" schemes for clarity.

IBE encryption schemes can be implemented using a number of different cryptographic algorithms. One such scheme is based on quadratic residues (see, e.g., "An Identity Based Encryption Scheme Based on Quadratic Residues," Eighth IMA International Conference on Cryptography and Coding, December 2001, Royal Agricultural College, Cirencester, UK, by Clifford Cocks). Another suitable scheme is based on elliptic curves (see, e.g., "Identity-Based Encryption from the Weil Pairing," by Dan Boneh and Matthew Franklin, extended abstract in Advances in Cryptology—Crypto 2001, Lecture Notes in Computer Science, Vol. 2139, Springer-Verlag, pp. 231–229, August 2001. See also http://eprint.iacr.org/2001/090 by Dan Boneh and Matthew Franklin). With the approach described in the work of Boneh and Franklin, IBE encryption is based on the properties of bilinear maps such as a Weil Pairing or Tate Paring. For clarity, aspects of the present invention will sometimes be described in the context of an identity-based encryption scheme such as the elliptic curve implementation described by Boneh and Franklin. This is, however, merely illustrative. Any suitable approach for IBE encryption may be used with system 10 if desired.

Initially, when the system is set up, an IBE private key generator (e.g., IBE private key generator 16 of FIG. 1) obtains or generates a master secret s. For example, the private key generator may create a master secret from a number that is randomly generated at the private key generator by a processor housed inside a tamper-proof enclosure. The master secret may also be produced off-site and delivered to the private key generator 16. The master secret (also sometimes referred to as a secret master key or a master key) is secret information that will subsequently be used by the private key generator 16 to generate private keys for recipients in the system to use in decrypting messages and to generate public parameter information for use by senders in encrypting messages.

After the master secret s has been obtained, the private key generator may generate the public parameter information. In the identity-based encryption approach of the above-mentioned work of Boneh et al., the public parameter information that is generated includes public parameters P and sP. The parameter P may first be generated by the IBE private key generator (e.g., using a random number generator). The parameter sP may then be generated by the IBE private key generator. The "multiplication" of s by P in the Boneh and Franklin work is accomplished using the multiplication of integers with points on elliptic curves. While multiplication (calculating sP) is straightforward, the inverse operation (determining s from knowledge of P and sP) is so computationally expensive that it is impractical for an attacker to obtain s in this way.

The public parameter information (e.g., the parameters P and sP in an identity-based encryption process based on elliptic curves) may be numbers. In general, there is an equivalency between numbers, letters, symbols, and other such schemes for representing information. Sometimes certain information (e.g., the master secret or public parameters) will be described as being in number form and sometimes certain information (e.g., a user's identity) may be described as being at least partly in character form (e.g., in the form of an email address). Because of the inherent equivalency between these different representational schemes, the techniques involved in converting letters or symbols into numbers or for representing multiple numbers or strings as a single number or other such operations are not described in detail herein.

After the public parameter information (e.g., P and sP) has been determined, the IBE private key generator 16 may make this information available to senders in system 10. The public parameter information may be provided to the senders using any suitable technique. For example, recipients may send the public parameter information to senders in email messages. If desired, the private key generator 16 may publish the public parameter information using a directory service or by placing the public parameter information on a particular host server that a sender can reach using an associated domain name or other suitable service name based on the recipient's public key. These are merely illustrative techniques for making the public parameter information available to users in system 10. Any suitable technique for making the public parameter information available to the users may be used if desired.

If the public parameter information includes more than one parameter, the parameters may be provided to the users together or separately. For example, parameters P and sP may be provided to a user together in a single transmission or separately in two transmissions. If parameters P and sP are provided separately, each parameter may be distributed using a different distribution mechanism. For example, P may be provided to a user over a secure sockets layer path and sP may be conveyed to the user in an encrypted email message. As another example, all users may know P in advance and sP may be distributed electronically. If desired, P may be the same for all or substantially all users in the system. Moreover, P and sP may be combined to form the equivalent of a single number or parameter or may be subdivided (e.g., to form three or more public parameter sub-parts). If desired, some of the public parameter information may be distributed manually (e.g., by printed mail or by distributing a diskette or other computer-readable media to the user).

Once the public parameter information (e.g., public parameters P and sP) has been provided to a user (i.e., a sender) who desires to send an encrypted message to another user (i.e., a recipient), the sender may encrypt and send the message to the recipient. An IBE encryption engine 18 implemented on the sender's equipment may be used to encrypt the message. The IBE encryption engine 18 may use the public parameter information (e.g., P and sP) and the IBE public key associated with the recipient to perform message encryption. When the recipient receives the IBE-encrypted message, or earlier, when the recipient sets up or updates the equipment at the recipient's location, the recipient obtains the recipient's IBE private key from the IBE private key generator 16 to use in decrypting the message. The recipient may use an IBE decryption engine 20 implemented on the recipient's equipment to decrypt the message. The IBE encryption engine 18 and decryption engine 20 may use software to implement the desired IBE encryption and decryption algorithms. Engines 18 and 20 may be provided to users in the system as part of the users' initially-loaded messaging software, as a downloadable program or plug-in, or using any other suitable technique.

Identity-based encryption (IBE) is so named because the encryption process at the sender uses an IBE public key Q that is generally based on the recipient's identity. The identity of a user in an IBE encryption scheme may be represented by any suitable string, number, or symbol. For example, the identity of a message recipient may be represented by that recipient's email address, name, or social security number. An advantage of IBE schemes is that a sender can generally determine the identity (e.g., the email address) of an intended recipient without all of the complexities involved in obtaining the PKE-public key of the intended recipient as would be required with traditional PKE schemes such as the RSA cryptographic scheme. For example, the IBE public keys may be the same as (or based on) user email addresses, which are readily obtainable.

The IBE private key generator 16 may generate IBE private keys for each of the multiple users associated with that IBE private key generator based on the IBE public keys (the Q's) of each of these users (e.g., based on the users' identities).

The form of IBE public key Q that is used for a given IBE scheme depends on the security features that are desired. For example, user privileges may be made to automatically expire by automatically concatenating a validity period (e.g., a date or date range such as the current day of the year and year, the current month, starting and ending dates such as Jan. 2, 2003–Jan. 10, 2003, or any other suitable time-related date-stamp information) with each user's email address to form Q values based not only on the users' identities (i.e., email addresses) but also validity period information. The validity period acts as an access policy for the encrypted message that is more generally applicable than the user-specific email address identity information.

According to the validity period, it is not permissible to access the contents of the encrypted message if the current date does not fall within the validity period. The policy may be enforced by the private key generator 16. If the current date is not within the validity period specified in the public key, the private key generator 16 will refuse to generate and provide an otherwise authorized message recipient with a copy of the corresponding private key that is needed to decrypt the message. With this approach, private keys do not have unlimited lifetimes, which enhances the security of the system.

As another example, users' privileges may be restricted based on security clearance level. With this approach, security clearance level information may be concatenated or otherwise added to each user's email address when forming the public keys Q (i.e., Q=joe@navy.com|top_secret, etc.). These approaches are merely illustrative of the ways in which policy-based criteria may be added to a user identity such as a user email address when forming the IBE public key for each user (e.g., the Q for each user). Any suitable approach for forming IBE public keys based on user identity information and additional criteria may be used if desired.

If desired, the IBE public keys used in system 10 may be based solely on non-user-specific access policy information and not on a specific individual's identity. As an example, an IBE public key may be based solely on an availability date (e.g., Mar. 20, 2003). The contents of a message encrypted using this IBE public key may not be accessed by any user until after Mar. 20, 2003.

With IBE encryption schemes whose IBE public keys represent access policies that are not specific to a single individual, IBE-encrypted messages may be distributed to numerous individuals in parallel (i.e., the "recipient" may be considered to be many individuals). Only those individuals who are authorized (i.e., those who have or can obtain the appropriate IBE-private key by satisfying the IBE public key access policy constraints) may decrypt the message and access its content.

A sender may also send an IBE-encrypted message to multiple recipients. For example, a sender may send a message to a list of distinct email addresses, each associated with a different recipient each of which has a different IBE private key. In this type of scenario, the sender encrypts the message sent to each recipient differently (i.e., using the appropriate IBE public key for each intended recipient).

When a sender uses a policy-based IBE public key Q to encrypt a message, the same version of the encrypted message may be sent to multiple parties in parallel. In this case, the recipient in the system 10 may be made up of multiple individuals or organizations. Anyone who can decrypt the message properly can view the message contents. Examples of multiple-party recipients to whom a sender may send an IBE-encrypted message include all members of a particular organization, all individuals or organizations with a particular security clearance, all supply chain management systems associated with the supplier's of a particular company, all subscribers to a particular service, etc.

A sender desiring to send an IBE-encrypted message should have information sufficient to construct the IBE public key Q of the intended message recipient. This information may include information on an individual recipient's identity (e.g., an email address), information on how to construct the IBE public key Q from suitable access policy information (e.g., validity period, security level, subscription level, content rating, geographic region, etc.), or any other suitable identity information and/or generally-applicable access policy information that specifies which parties are allowed to access the contents of the message and under what conditions such access is permitted.

The sender must also obtain the public parameter information (e.g., P and sP) associated with the intended recipient of the message prior to message transmission.

Once the sender has the IBE public key of the recipient and the appropriate corresponding public parameter information, the sender may use the IBE encryption process (e.g., the process of the work of Boneh and Franklin described above) to encrypt the message contents for the recipient. The IBE process may be implemented using software at the sender's equipment such as IBE encryption engine 18. The encryption engine 18 may be a stand-alone process or application or may be incorporated into another process or application. If desired, such a process or application (whether stand-alone or multi-function) may be referred to as a user's "client" software or "client." The IBE encryption engine 18 may take as inputs (1) the message to be encrypted, (2) the IBE public parameter information (e.g., P and sP), and (3) the IBE public key Q. The IBE process implemented using the IBE encryption engine 18 produces an encrypted version of the message as its output.

The sender may transmit the encrypted message to the recipient using an email program or other suitable software. After the sender transmits the IBE-encrypted message to the recipient over communications network 14, the recipient may receive the message. The recipient may decrypt the received message using an appropriate IBE private key. The recipient may use decryption engine 20 to decrypt the message. The IBE private key that is used for decrypting the message is related to the IBE public key Q and public parameter information (e.g., P and sP) used when encrypting the message. Only the IBE private key that matches the IBE public key that was used to encrypt the message may be used to decrypt the message. Generation of the IBE private key requires knowledge of the master secret s, so only the appropriate private key generator 16 can generate the recipient's IBE private key based on the recipient's IBE public key Q.

With one suitable approach, the IBE private key for the recipient may be generated from the recipient's IBE public key Q and the master secret s by using an appropriate mathematical function (e.g., the multiplication of integers with points on elliptic curves) to calculate the value of sQ.

The recipient's authorization to receive the message may be verified using authentication information (credentials) from the recipient and using other information (e.g., independently-gathered information on the current date). The private key generator 16 may use the access policy embodied in the IBE public key to determine whether a given recipient is authorized. Once the IBE private key generator 16 verifies that the recipient is authorized to access the message contents, the private key may be issued to the recipient by the IBE private key generator 16.

If desired, the IBE private key generator 16 and the recipient may use intermediate parties as agents during the process of providing recipient credentials, verifying the recipient's authorization to access the message content, and providing the IBE private key. For clarity, the present invention is primarily described without the presence of such intermediate agents. Any suitable manual or automatic authentication technique may be used by the IBE private key generator 16 to verify that the recipient (or the recipient's agent) is authorized to receive the IBE private key prior to issuing the key to the recipient.

Regardless of how the IBE private key generator 16 determines that the recipient is authorized to obtain the IBE private key, the private key should be provided to the recipient for use in decrypting the message. Any suitable technique may be used to provide the IBE private key to the recipient. For example, the private key may be transmitted to the recipient in an email or other suitable message or may be made available for downloading over the Internet (as part of a stand-alone downloadable application or a downloadable plug-in module, as a stand-alone key, etc.). A secure communications channel may be used for electronic communications between the IBE private key generator 16 and the recipient's equipment 12. If desired, the IBE private key may be preinstalled on the recipient's equipment, so that the private key will be available for the recipient when the recipient first uses the equipment. The private key may also be distributed by mail or courier (e.g., on a computer-readable medium such as a computer disk or memory chip).

The recipient may, if desired, store the private key locally (e.g., in a database on a storage device such as a memory circuit or hard drive on the recipient's equipment). If the private key is stored locally (and has not expired or otherwise become obsolete), the recipient can retrieve it the next time a message needs to be decrypted without needing to contact the IBE private key generator 16 to obtain a new copy of the IBE private key over the communications network.

The sender may cache public parameter information on the sender's equipment in a similar fashion to facilitate retrieval of the public parameter information when it is desired to send an encrypted message.

Figure 2:
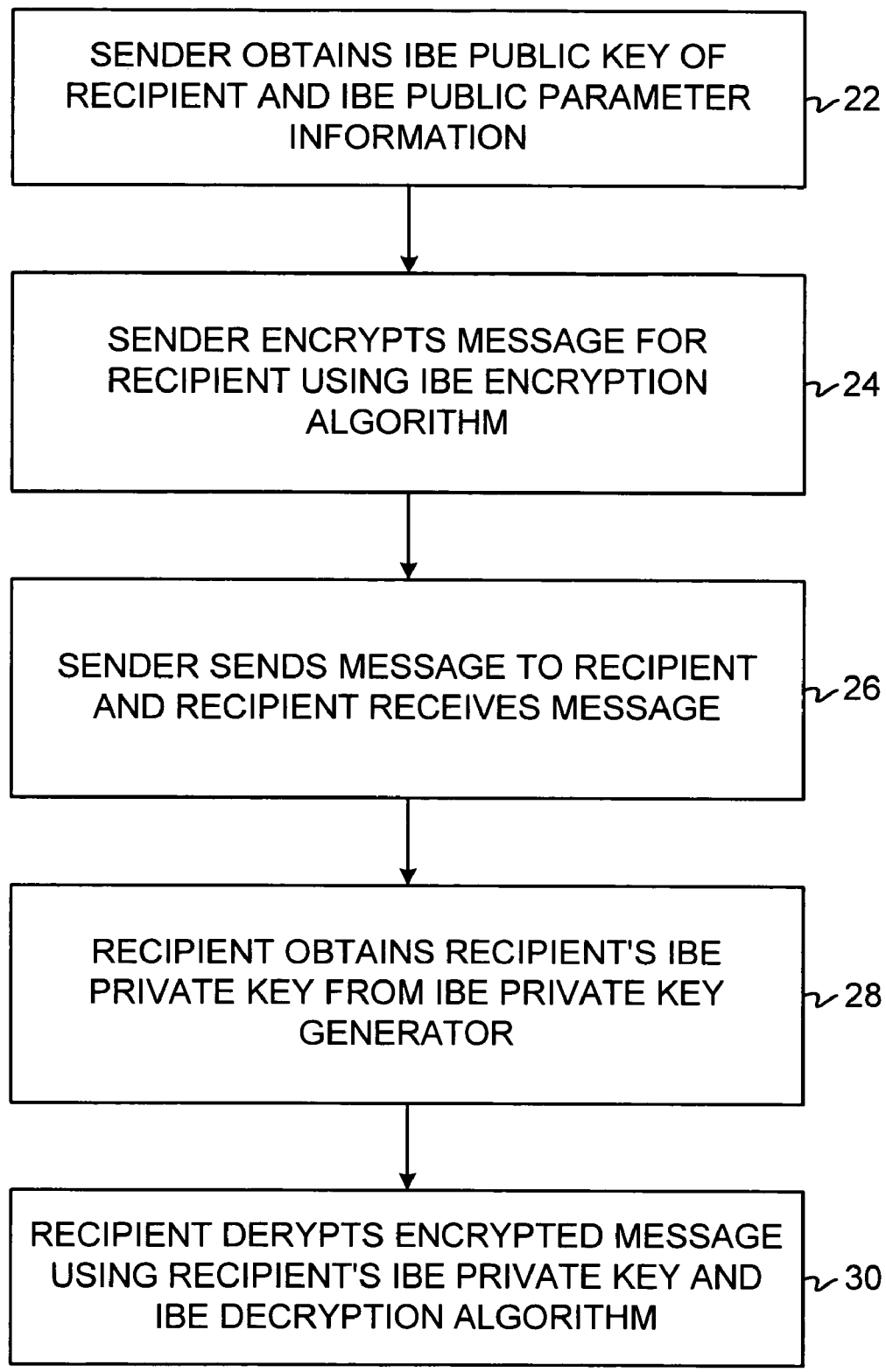
FIG. 2 is a flow chart of illustrative steps involved in using identity-based-encryption techniques to support secure messaging in accordance with the present invention.

Illustrative steps involved in using IBE-encryption to convey a secure message from a sender to a recipient in system 10 are shown in FIG. 2. At step 22, the sender may obtain the IBE public key Q of the intended recipient and the associated IBE public parameter information (e.g., parameters P and sP). The IBE public key Q may be obtained from a source that has a copy of the appropriate IBE public key Q or may be generated based on known rules (e.g., by obtaining the recipient's email address or other identity information, by determining a suitable validity period or other generally-applicable access policy information, and by using this information to generate Q). The IBE public parameter information may be obtained from the recipient or other suitable party, may be obtained over network 14 from a directory service (e.g., a directory service implemented on a server connected to network 14), or may be obtained over network 14 from a host associated with the IBE private key generator 16 that generated the public parameter information. The IBE public key Q and IBE public parameter information may be cached locally by the sender for later retrieval if desired.

At step 24, the sender may use IBE encryption engine 18 (FIG. 1) to encrypt a message for the recipient.

The IBE-encrypted message may be sent to the recipient over network 14 and received by the recipient at step 26. The message may be accompanied by information on the IBE public key Q that was used to encrypt the message. This information may be used by the recipient in determining which private key generator 16 to contact at step 28 to obtain the IBE private key needed to decrypt the message.

To obtain the IBE private key from the private key generator at step 28, the recipient may provide information on Q (e.g., Q, a precursor of Q, or a derivative of Q) to the private key generator that the private key generator can use to determine which private key is being requested (and which access policies apply). The recipient can provide the private key generator with recipient credentials such as username and password information, biometric information, age information, and other suitable identity and authentication information that the private key generator 16 may use to verify that the recipient is authorized to obtain the requested IBE private key.

If desired, certain access policies may be implicit. Moreover, the private key generator may use its own information (e.g., information on the current time and date) as well as recipient-provided information in determining whether or not a given recipient is authorized to obtain the IBE private key. During the authentication process, the recipient and the IBE private key generator may communicate using secure communications (e.g., using PKE-encrypted messages, a trusted communications path, a secure communications link such as an SSL or TLS link, etc.).

When the private key generator 16 determines that the recipient is authorized to obtain a copy of the IBE private key, the private key may be provided to the recipient securely at step 28 (e.g., in a secure message or over a secure communications link in network 14).

At step 30, after the recipient has obtained the appropriate IBE private key, the recipient may use this private key with decryption engine 20 (FIG. 1) to decrypt the encrypted message.

There are typically many private key generators 16 in system 10, so it is helpful when the sender sends the IBE public key Q to the recipient with the message. The recipient may use the information on the IBE public key Q that is provided with the message in requesting the appropriate IBE private key from the IBE private key generator. For example, the recipient may determine from Q that the needed IBE private key may be obtained from an IBE private key generator 16 that is associated with a movie subscription service or the recipient may determine from Q that the needed IBE private key is to be obtained from a private key generator 16 that is associated with the recipient's employer. The recipient may pass Q to the private key generator when requesting the corresponding private key.

When system 10 has multiple private key generators 16, each private key generator 16 may have a group of associated users. The users associated with a given IBE private key generator 16 may receive messages that are encrypted using the IBE public parameters from that IBE private key generator and may contact the given IBE private key generator 16 when it is necessary to obtain an IBE private key to decrypt these messages. Each IBE private key generator 16 and the set of users who are associated with that IBE private key generator 16 may be referred to as a "district."

Figure 3:
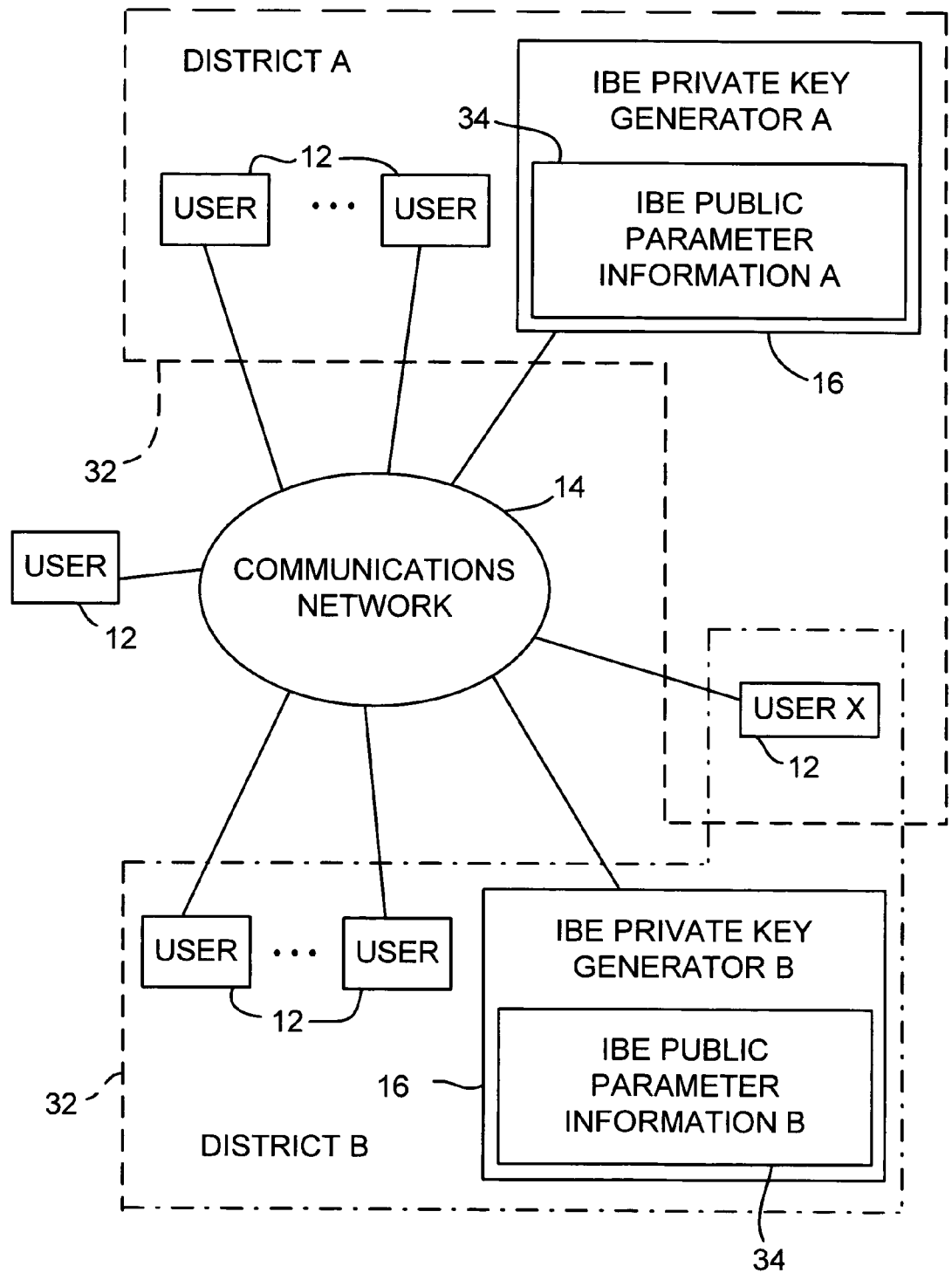
FIG. 3 is a diagram showing how users may be associated with different districts, each of which has an associated IBE private key generator in accordance with the present invention.

The schematic diagram of FIG. 3 shows how system 10 may have multiple districts 32 each having their own IBE private key generator 16 and associated IBE public parameter information 34. In the example of FIG. 3, two districts are shown: district A and district B. In general, there may be any suitable number of districts 32 in system 10. Some users 12 may only be associated with one district. For example, some users may be associated with a district that is operated by their employer. Other users may be associated with multiple districts (e.g., one operated by their employer and one operated by a school or one operated by one department at their employer and another operated by a different department of the same employer, etc.).

With the arrangement of FIG. 3, some users are only associated with district A. IBE-encrypted messages sent to these users must be encrypted using the IBE public parameter information A that is associated with the IBE private key generator A for the district. When these users desire to decrypt an IBE-encrypted message, they can obtain the appropriate IBE private key information from IBE private key generator A. Some users in FIG. 3 are only associated with district B. These users can receive IBE encrypted messages if the messages are encrypted using IBE public parameters B. These users can decrypt such IBE-encrypted messages by obtaining the appropriate IBE private key from IBE private key generator B.

In the example of FIG. 3, districts 32 are not mutually exclusive. User X is associated with both district A and district B. When sending a message to user X it may be desirable to inform user X which district the message is associated with (e.g., district A or district B). Providing this information to user X helps user X determine which district's IBE private key generator to contact to obtain the necessary IBE private key to decrypt the encrypted message.

When there is more than one district in system 10, and particularly when there are many districts, each district may be operated differently. For example, some districts may use one format for the IBE public keys of their associated users, whereas other districts may use a different format. IBE message formats may also differ between different districts.

As a result of the variability in the encryption protocols, communications protocols, and other policies used by different districts, it can be difficult for a sender to determine how to correctly send an IBE message that will be received by a desired recipient.

Differences between districts may also make it difficult for a sender to determine whether or not it is appropriate to send certain content to a given recipient. For example, a sender may want to send a message to a group of recipients in different districts. If one of the recipients is in a district with weak authentication procedures, the security of the message will be compromised, because message security relies at least partly on the strength of the weakest links in the communications process. As a result, the sender may desire to withhold the message from that recipient.

As another example, consider a physician who desires to send a patient record to a hospital. Government regulations may require that patient data be encrypted before it can be transmitted. However, merely securing the data during transmission will not be sufficient if the recipient is not trustworthy. Accordingly, the government regulations may further specify that patient data be sent only to recipients who have been certified by an appropriate oversight agency as being trustworthy. This attribute of the hospital's district (e.g., certification by the oversight agency) may make the hospital a suitable recipient for the patient record, whereas it would be inappropriate for the doctor to send an IBE-encrypted copy of the patient record to a hospital that does not have the proper agency certification.

In accordance with the present invention, each district may have associated protocol or policy information ("district policy information") that senders can use in sending messages to recipients in the district. If the district uses a particular message format, for example, the sender can take care to conform the IBE message to that format (or to refrain from sending a message if the format cannot be complied with). If the district has an authentication policy that is so weak that sending a particular type of message becomes unacceptable, the sender can refrain from sending the message or can attempt to locate a more appropriate district and/or recipient to which to send the message. Client-side information (e.g., information on message contents, client policies, etc.) may be used in conjunction with the district policy information in determining how and whether to send messages to a recipient in a particular district.

Figure 4:
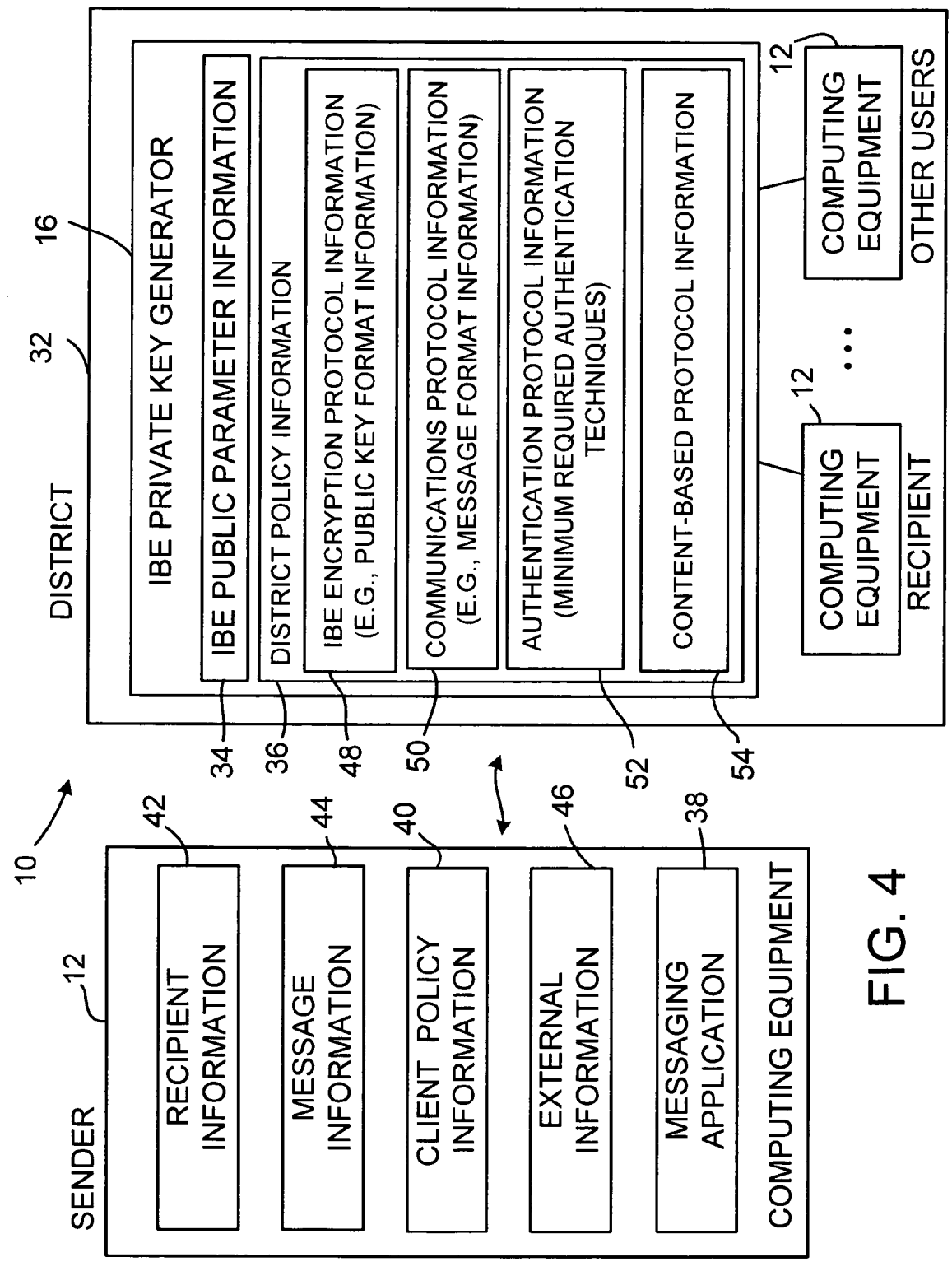
FIG. 4 is a diagram showing how district policy information and other information can be used to control the flow of IBE-encrypted messages in an IBE messaging system in accordance with the present invention.

The diagram of FIG. 4 shows how a district 32 in system 10 has an IBE private key generator 16 with IBE public parameter information 34 and associated district policy information 36. The district policy information that is associated with a given district may be stored on the IBE private key generator 16 of the district or at any other suitable storage location. The district policy information is preferably stored in such a way that the sender can obtain a copy of the district policy information before sending a message to a recipient associated with that district. In the diagram of FIG. 4, a recipient and other users (i.e., other potential recipients) are shown as being associated with district 32.

The email application or other messaging application that the sender uses to send messages to recipients is shown in FIG. 4 as messaging application 38. The messaging application 38 may be an email application or an instant messaging application. The messaging application may also be an application in which messaging applications are embedded within a more complex set of functions. As an example, the messaging application 38 may be a stock trading application in which after reviewing online portfolio information, the sender may send a stock trade to a broker. The stock trade may be sent as an IBE-encrypted message. As another example, the messaging application 38 may be a medical records management application. With this application, a patient record may be transferred from one entity to another in the form of an IBE-encrypted message. These are merely illustrative examples. Messaging application 38 (also referred to as the IBE client or client process) may be any suitable application (or operating system function) with which IBE messages are sent.

The messaging application 38 may obtain district policy information 36 from the district associated with a given recipient during a set up process or later, when composing a message for the recipient. The district policy information may be provided to the sender using any suitable technique. For example, this information may be provided over a secure path, may be provided on a diskette or other storage media, may be transmitted over a secure physical connection (e.g., over the telephone or in writing or fax) or may be transmitted using any other suitable technique. With one suitable approach, the district policy information is provided in the form of one or more digitally-signed list entries. By verifying the digital signatures on the list entries, the sender can be assured that the district policy information is authentic and has not been altered by an attacker even if the list entries are retrieved over an insecure link.

The behavior of the IBE client 38 may be governed by client policies set forth in client policy information 40. The client policy information 40 may be stored in a data structure (e.g., in a client policy file stored in memory on the sender's computing equipment 12 or on a remote server, etc.) or may be embedded in the client by hard-coding the policy into the client software. If desired, a combination of these approaches or other suitable approaches may be used to provide the client policy information to the messaging application.

The client policies may force the messaging application to take certain actions. As an example, when a district provides a legal disclaimer notice to the messaging application, the client policy may require that this legal disclaimer notice be displayed to the sender.

The actions of the messaging application may be influenced by recipient information 42 (e.g., message address information or other identity-based information associated with the recipient), message information 44 (e.g., message contents), and external information 46 (e.g., the current date and time).

The district policy information 36 may include IBE encryption protocol information 48, IBE communications protocol information 50, IBE authentication protocol information 52, content-based protocol information 54, and other suitable information on the protocols (policies) associated with the district.

The IBE encryption protocol information 48 may include information on the particulars of the IBE encryption and decryption process being supported by the district. For example, the IBE encryption and decryption engines used by various entities in the system may change slightly as software is upgraded. These upgrade changes may influence the acceptable formats and sizes of certain IBE data structures.

As an example, the format used for the IBE public key may change. One district may use a public key formed by concatenating a user's email address with an expiration week number (e.g., joe@company.com|week234), where the week number is incremented upwards by one each week, starting from a known fixed date. Another district may use a slightly different IBE public key format in which IBE public keys are constructed by concatenating a user's email address with an expiration date in mm-dd-yy format (e.g., joe@company.com|010107). The IBE encryption protocol information 48 may specify which IBE format is used by the district (e.g., by specifying the layout for the validity period format and the known starting week that are used by the recipient's messaging software in the district). If the district supports multiple formats, each format may be included in the IBE encryption protocol information 48.

When a validity period is incorporated into an IBE public key, messages can be sent into the future. With this approach, the message content remains encrypted and cannot be unlocked until a particular date has arrived. If desired, the IBE encryption protocol information 48 may include information on whether the district supports the sending of messages into the future and if this feature is supported, how far into the future such messages may be sent.

The IBE public key format used by a district may allow membership in groups to be established. If group membership functions are supported, the details of how group membership is specified may be provided in the IBE encryption protocol information 48.

Another IBE encryption capability that may be supported by the district involves privileges (clearance levels). IBE public keys may support different privilege or clearance levels by concatenating clearance level information with a username (e.g., an IBE public key might be joe@company.com|top_secret). If clearance level functions are supported by the district, information on how privilege levels are specified may be included in the IBE encryption protocol information 48.

The district may support certain communications protocols, as set forth in the IBE communications protocol information 50. The IBE communications protocol information 50 may include information on the types of messages that are supported. For example, the IBE communications protocol information 50 may include message format information such as the message header arrangement being used and size limitations on messages (e.g., minimum and/or maximum sizes for the bodies of the messages and for message-related information). Communications protocol information 50 may also specify which digital signature formats are acceptable to the district and which signature algorithms are supported. Some senders may desire to send message content using different formats, so the IBE communications protocol information 50 can include information that specifies whether these formats are supported (e.g., whether or not the body of the message can be in HTML text). The software of client 38 may have different associated version numbers, so, if desired, the communications protocol information 50 can specify whether or not a particular client version number is supported.

Authentication protocol information 52 may include information on the protocols that are used by the district to authenticate its associated users. For example, the authentication protocol information 52 may contain information indicating that all users in a given district are authenticated using hardware tokens before the users are provided with their IBE private keys. Other authentication techniques that may be used include biometric identification, smartcard authentication (where a code is validated from a smart card at the recipient), username and password authentication, in-person authentication, etc. If desired, a standards body may promulgate authentication standards and may assign these standards certain "levels." The authentication protocol information 52 may then be represented in the form of such levels. In general, the authentication protocol information 52 may include any suitable information on the processes and protocols used during user authentication and verification by the district.

Districts may handle messages differently depending on their content. For example, when certain particularly sensitive messages are sent to the recipients associated with a district, the district may desire to have a notice displayed for the sender. The ways in which such content-based policies are implemented can be set forth in content-based protocol information 54. Consider a district belonging to a brokerage. When the brokerage receives an attempted electronic trade, the brokerage may want to display a notice on the sender's client stating "trades not accepted at this address." The content-based protocol information 54 for a district may contain a list of certain types of content that are acceptable to send to the recipients of that district and/or a list of certain types of impermissible content. As an example, a brokerage district may contain permissible content information in the protocol information 54 that specifies that messages in the class "trades" are not (or are) permissible.

The encryption protocol information 48, the communications protocol information 50, the authentication protocol information 52, the content-based protocol information 54, and other suitable district policy information 36 may be provided explicitly in the form of one or more encryption, communications, authentication, or content policy entries in a list or other suitable data structure. Some or all of the district policy information may also be provided implicitly. For example, the district policy information 36 may contain information on a particular standard that is adhered to by the district. The standard may be promulgated by an independent standards organization and may cover many facets of the operation of the district. Although the name or other identifier used to indicate which standard is being used will not necessarily specify the encryption policy, communications formats, level of encryption, etc. that are to be used, this information can be inferred from the use of a sufficiently specific identifier for the standard. Similarly, a software version number may not explicitly set forth the district's policy, yet implicitly contains this information because one can look up the details of that version of software. Accordingly, the district policy information 48 may be expressed explicitly, may be expressed by reference to a standard (e.g., from a standards body, by reference to a format or version number, by reference to a level such as a security level), or may be expressed using any other shorthand notation that reflects the policies of district policy information 36.

The policies of the district may sometimes be enforced by the district. For example, use of a certain IBE public key format may be mandatory, because if this format is not used, the district will not recognize the IBE public key being presented during an IBE private key request. Using any other IBE public key format will therefore fail.

The policies of the district may also sometimes be enforced through the cooperation of the client 38. For example, client 38 can refrain from sending messages encrypted using incorrectly formatted IBE public keys (as determined by the district policy information 36). As another example, the district may have a notice to display when a sender attempts to send impermissible content to the district. When the impermissible content is detected (e.g., from analyzing a message header or other such information associated with an IBE encrypted message), the district may direct the client software 38 to display a given notice to the sender. The client software 38 may be hard-coded to automatically comply with this request type of from the district.

Client behavior may be hard-coded into the client or may be specified using an external policy file (or other suitable client policy data structure). Regardless of how the policies of the client are determined, the client 38 preferably uses these policies when supporting messaging operations for the users of the system 10. The behavior of the system is also influenced by external factors such as information on the recipient 42 (e.g., the recipient's identity), information on the message 44 (e.g., message size, format, content, and other attributes), and external information (e.g., the time and date, etc.). This information may be used as an input to both the client-side and the district-side processes used when operating system 10.

Figure 5:
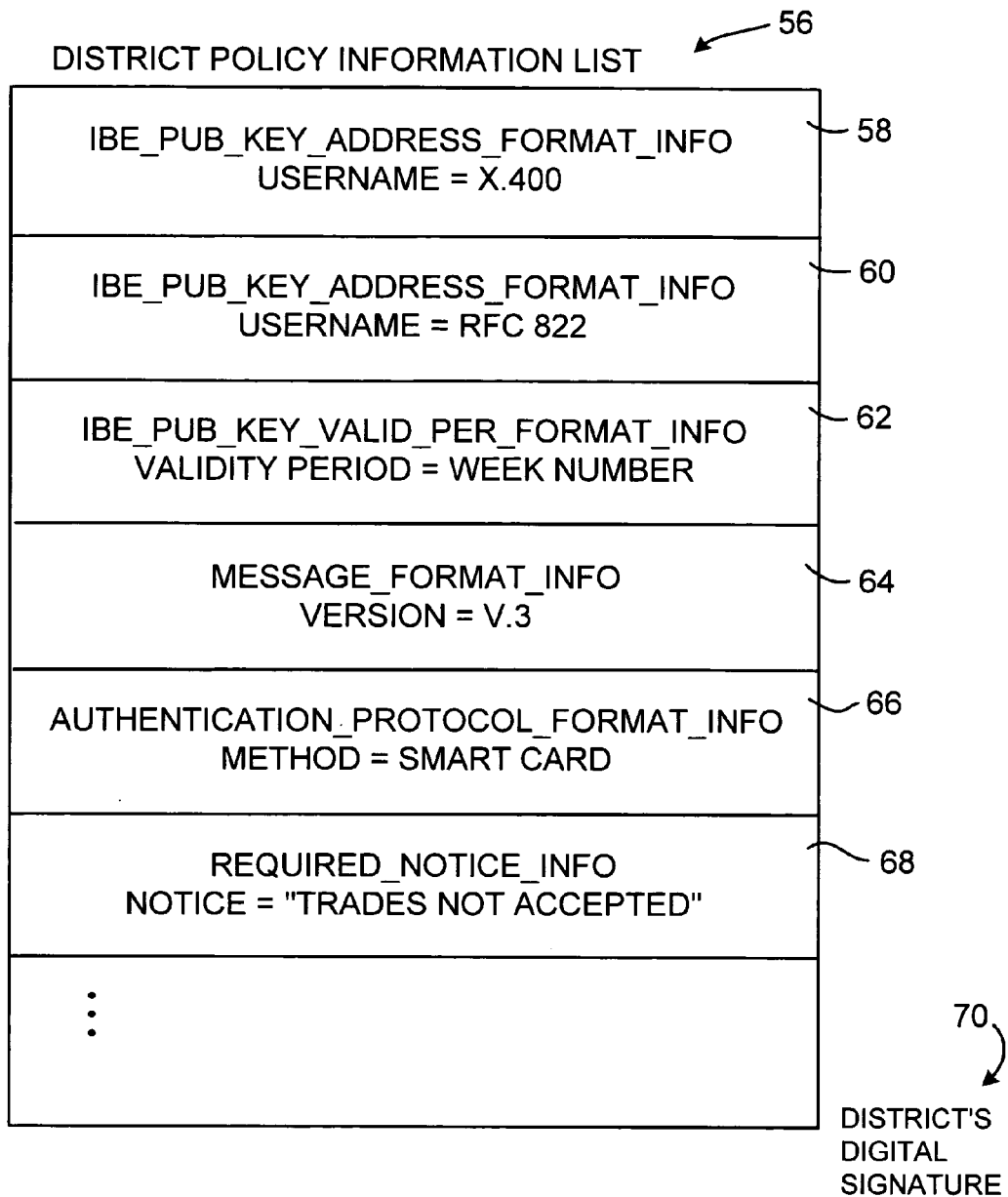
FIG. 5 is a diagram showing an illustrative district policy information list in accordance with the present invention.

An illustrative district policy information file in which the district policy information 36 for a given district may be maintained is shown in FIG. 5. The district policy information file may be stored on the same server that is used to implement the IBE private key generator 16 for the district (and that may be used to host the IBE public parameter information 34). The arrangement of FIG. 5 is merely illustrative. Any suitable format for the district policy information may be used if desired.

In the example of FIG. 5, district policy information 36 is arranged in the form of a district policy information list 56 having multiple entries. Each entry may have an identifier that specifies the type of entry involved. As an example, the first entry 58 in list 56 may be an entry that specifies an encryption protocol (i.e., entry 58 may be an example of IBE encryption protocol information 48 of FIG. 4). As shown in FIG. 5, entry 58 may be headed with the identifier "IBE_PUB_KEY_ADDRESS_FORMAT_INFO," which indicates that this entry specifies the format used by the district for the IBE public key Q. In entry 58, the format of the username portion of Q is being specified (i.e., by specifying that the format X.400 is used for this portion of the IBE public key Q). Entry 60 is also headed by the identifier "IBE_PUB_KEY_ADDRESS_FORMAT_INFO," indicating that the information in entry 60 also pertains to a supported format for the IBE public key. In entry 60, the format of the username portion of Q is specified as using the RFC 822 standard. In this example, there are therefore two different supported ways in which to form the username portion of Q for sending messages to recipients in the district.

Entry 62 also contains IBE encryption protocol information 48. In entry 62, the header "IBE_PUB_KEY_VALID_PER_FORMAT_INFO" identifies entry 62 as corresponding to a supported format for the validity period portion of Q (which may, for example, be concatenated after the username portion so that Q=username|validity period). In the example of FIG. 5, the validity period information for the IBE public keys in the district is constructed using a "week number" format in which the current date is identified by an offset from a particular known starting week.

A sender (with client 38 of FIG. 4) can use the information of entries 58, 60, and 62 to determine how to properly construct the IBE public key of a given recipient before that IBE public key is used to encrypt a message for the given recipient. This information therefore helps to prevent situations in which senders use the wrong procedures for constructing the IBE public key.

The identifier MESSAGE_FORMAT_INFO of entry 64 indicates that the information that follows (version=v.3) relates to a supported format for the messages handled by the district. In this example, messages for recipients in the district must use the v.3 standard or higher. The type of message format that is used is an example of a type of communications protocol information 50 (FIG. 4). Client 38 may check that the version requirements specified by entry 64 are satisfied by the software installed at the sender, before the client sends a message. This helps to alleviate potential problems due to software incompatibility issues.

Entry 66 has an associated identifier "AUTHENTICATION_PROTOCOL_FORMAT_INFO" that indicates that the following information (method=smart card) relates to the type of authentication protocol that the district uses to authenticate its users. In the example of FIG. 5, the district requires each recipient's identity to be verified by matching a code to a code stored in a smart card. Only after this smart-card authentication process has been completed successfully will the recipient be provide with the IBE private key needed to decrypt that recipient's IBE-encrypted messages. The information in entry 66 can be examined by a sender before a message is sent to determine whether the district authentication procedures are sufficiently secure to satisfy the sender's security needs. Authentication protocol information 52 such as the information in entry 66 (and other district policy information) may be provided using text, levels (e.g., security level 1.1, etc.), standards (e.g., ITU standard 1234), versions (e.g., client version No. 4.5), or any other suitable representation.

Entry 68 is an example of an entry containing content-based protocol information 54 (FIG. 4). The identifier in entry 68 is "REQUIRED_NOTICE_INFO." The notice that is required is a notification stating "Trades Not Accepted." When a client 38 sends or prepares to send an IBE-encrypted message to a recipient in the district (which may be a brokerage in this example) client 38 uses its knowledge of the content of the message to determine whether or not the required notice from entry 68 should be displayed for the sender. If the client determines that the message being sent is a securities trade, the client may display the notice "Trades Not Accepted" for the sender, to inform the sender that the trade cannot be sent to the recipient and/or brokerage in the district to which the client was attempting to send the trade. If the client determines that the message being sent is not a trade, the client can proceed to encrypt and send the message to the recipient.

The district policy information 36 can be digitally signed. For example, each of the entries of list 56 (or groups of such entries or the entire list) may be signed using one or more digital signatures such as digital signature 70. The digital signatures may be associated with the district (as with the example of FIG. 5) or may be the signatures of a third party (e.g., a standards body, an oversight authority, an agency that approves or certifies compliance with particular standards, etc.). The digital signatures may be based on PKE private keys that are verified by the sender using corresponding PKE public keys.

Figure 6:
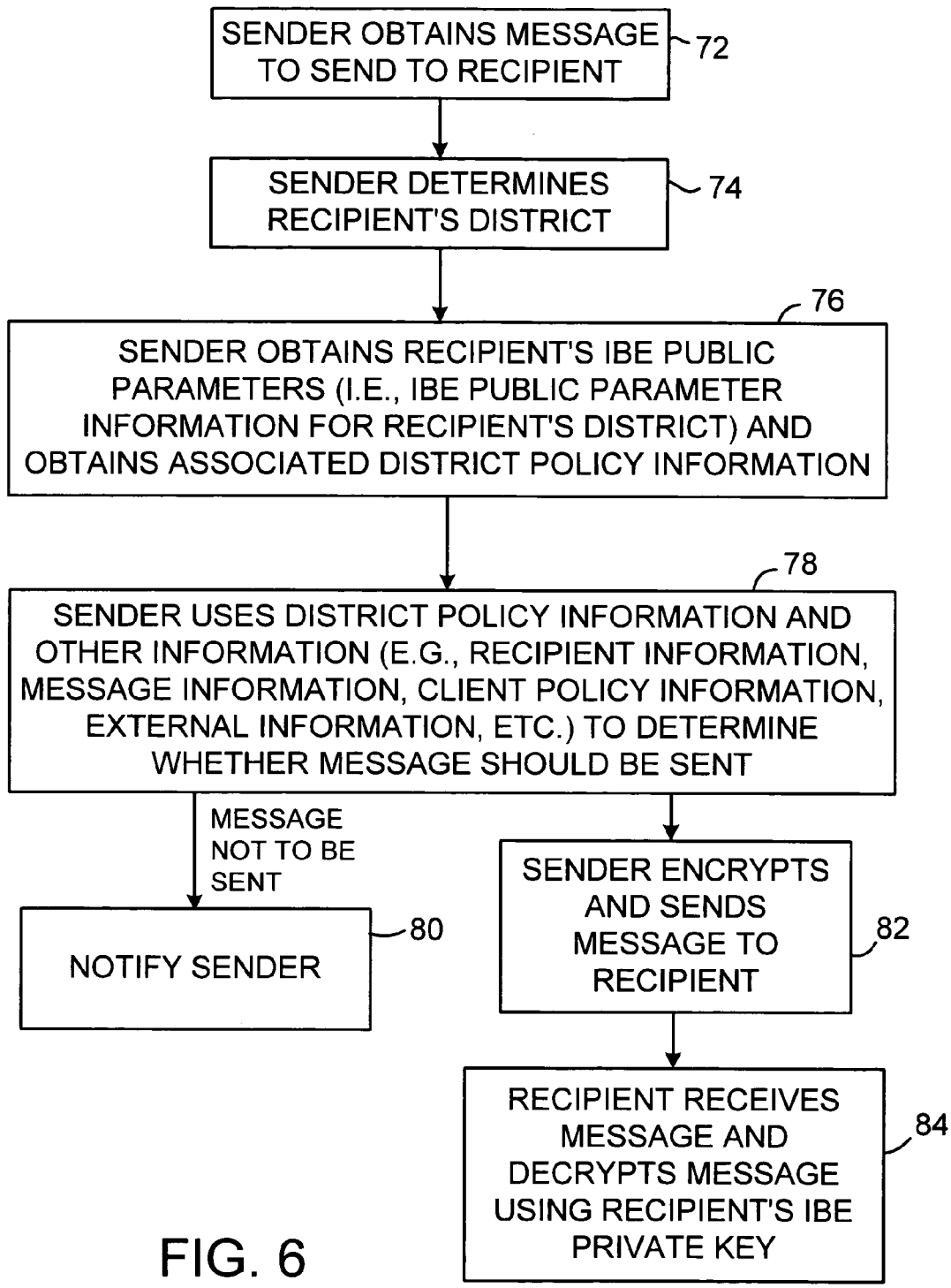
FIG. 6 is a flow chart of illustrative steps involved in sending messages in an IBE messaging system in which there are multiple districts each having an associated IBE private key generator with corresponding district policy information in accordance with the present invention.

Illustrative steps involved in using system 10 are shown in FIG. 6. At step 72, the sender obtains a message to be sent to a given recipient. The message may be composed by the sender, obtained from a third party, generated by software on the sender's equipment, or produced using any other suitable technique.

The recipient is associated with a district 32 having an associated IBE private key generator 16. The recipient's IBE private key generator may, for example, be operated by the recipient's employer.

At step 74, the sender determines the recipient's district. The recipient may, for example, provide this information to the sender. A published directory may be used to provide online information on recipient districts to senders. Senders can consult the directory prior to sending messages. Another suitable approach for identifying the district involves using known rules to construct a service name (e.g., a domain name) from the recipient's email address (or other identity-based information). The district may be identified using the service name.

At step 76, the sender obtains the recipient's IBE public parameter information and district policy information. Any suitable technique may be used to obtain this information. For example, the sender may use a service name based on the recipient's identity or other information on the recipient's district to obtain the IBE public parameter information 34 and the district policy information for the district. The sender may use a service name that is constructed from recipient identity information such as the recipient's email address (as an example) to locate a host server associated with the IBE private key generator 16 for the district. The sender (client 38) can then download the IBE public parameter information 34 and district policy information 36 onto the sender's equipment 12.

These approaches are merely illustrative approaches that may be used to provide the sender with the IBE public parameter information and/or district policy information of a given recipient. Any suitable technique may be used to provide the sender with this information if desired.

Once the sender has obtained the recipient's district's IBE public parameters and district policy information (e.g., by obtaining this information from the IBE private key generator 16 or a service associated with the IBE private key generator 16), the sender can use this information in sending the message to the recipient (step 78). In particular, the sender may use district policy information 36 such as IBE encryption protocol information 48 to determine the way in which to form the IBE public key for the recipient. The sender's client process 38 may use recipient information 42 (e.g., recipient identity information), external information 46, and other information in forming the IBE public key for the recipient according to the protocol information 48.

During step 78, the sender may use district policy information 36 such as communications protocol information 50 to determine which communications protocols are supported by the district. If a communications protocol that the sender needs to use is not supported, message transmission can be aborted. If the district requires a communications protocol that the sender is capable of supporting, the sender's client process 38 can conform to this requirement.

During step 78, the authentication protocol information 52 may be used by the client 38 to ensure that the authentication policies used by the district are satisfactory to the sender. If the sender requires higher levels of security than are supported by the district, the sender may decide not to complete the message transmission process.

Content-based protocol information 54 within the district policy information 36 may be used to determine whether or not the message should be sent and whether or not other actions should be taken. For example, the content-based protocol information 54 may specify that certain notices be presented to the sender by client 38 when an attempted IBE communication is made in which the content of the message matches certain criteria. As another example, the content-based protocol information may be used by client 38 to prevent transmission of messages to the district based on their content.

During these operations in step 78, the client process 38 and the IBE private key generator 16 may use additional inputs, such as information on the recipient 42 (FIG. 4) (e.g., the recipient's address or security level), information on the message 44 (FIG. 4) such as information on message content or communications protocol attributes, information on client policies 40 (FIG. 4) (e.g., client policy information stored in a file or hard-coded into client 38), and external information 46 (FIG. 4) such as information on the time, date, etc.

If it is determined at step 78 that the message should not be sent, the client can take appropriate actions at step 80. For example, the client 38 can display a notification message for the sender on the sender's display or can attempt to find a more appropriate destination for the message.

If the client process 38 determines at step 78 that the message should be sent and has determined how to send that message (e.g., which protocols should be used), the client may, at step 82, encrypt and send the message to the recipient. During step 82, the appropriate encryption and communications protocols that were identified using the district policy information 36 and other information at step 78 may be used by the client. Notices may be provided to the sender if required and other actions specified by content-based protocol information 54 (FIG. 4) and client-side information may be performed. IBE encryption engine 18 (FIG. 1) may be used to perform encryption operations. The message may be sent to the recipient over communications network 14.

At step 84, the recipient may receive the IBE-encrypted message from the sender. The recipient may then request the IBE private key from the IBE private key generator for the recipient's district. The IBE private key generator, after authenticating the recipient, may provide the recipient with the necessary IBE private key for decrypting the message. During these operations, the IBE private key generator 16 may use the encryption and communications protocols and the authentication protocols specified by the district policy information. The recipient may use decryption engine 20 (FIG. 1) to decrypt the encrypted message.

A particular district may be divided into multiple associated districts (called subdistricts). Arranging a district in this way may be beneficial for organizations in which a multi-level approach to secure communications is desired.

As an example, consider a brokerage. The brokerage may receive many communications that are only of moderate sensitivity. Thus the default authentication procedure used for most employees may involve only username and password authentication techniques. Other communications (e.g., electronic securities trades) may be much more sensitive.

With the present invention, the brokerage can operate two subdistricts each with a different IBE private key generator and a different set of associated users. (The users for each district may be mutually-exclusive or overlapping.) Most employees can be associated with the less secure subdistrict. The employees (and/or the computer processes) that receive electronic trades can be associated with the more secure subdistrict.

The district policy information at the brokerage may be used by senders to determine how to send secure IBE communications to the organization. For example, when a client process 38 at the sender determines that a trade is being sent to the brokerage, the client can use the district policy information to ensure that the appropriate (more secure) subdistrict is involved in the communication. If the message was initially to be sent to the wrong destination within the brokerage (e.g., a recipient associated only with the less secure subdistrict), the district policy information may be used by the client process 38 to determine a more appropriate recipient or to abort the transmission of the message.

If the message was initially to be sent to the correct recipient, but was to be encrypted using inappropriate IBE public parameter information, the client process can detect this potential problem and can use more appropriate IBE public parameter information. For example, rather than encrypting an electronic trade message for a recipient computer process using IBE public parameter information associated with a less secure subdistrict, the client can use IBE public parameter information associated with an available more secure subdistrict that is associated with the same recipient computer process.

When there are multiple subdistricts associated with a district, the district policy information may be organized as shown in FIG. 7. As shown in FIG. 7, the district policy information may be stored in a list or table 86. The information for table 86 may be stored on each IBE private key generator 16 in the district (i.e., on each subdistrict's IBE private key generator), may be divided into information suitable for each subdistrict and stored in the form of appropriate sublists, or may be stored at any other suitable location or locations associated with the district and subdistricts.

The district policy information list 86 has entries that associate the IBE public parameter information for each subdistrict with corresponding district policy information for that subdistrict. For example, entry 88 contains IBE public parameter information for subdistrict 1 and associated district policy information (subdistrict policy information) for subdistrict 1. Similarly, list entry 90 includes IBE public parameter information for subdistrict 2 and associated district policy information for subdistrict 2. Other information such as information identifying which users are associated with each subdistrict or service name information identifying each subdistrict may be included in list 86 if desired.

Figure 8:
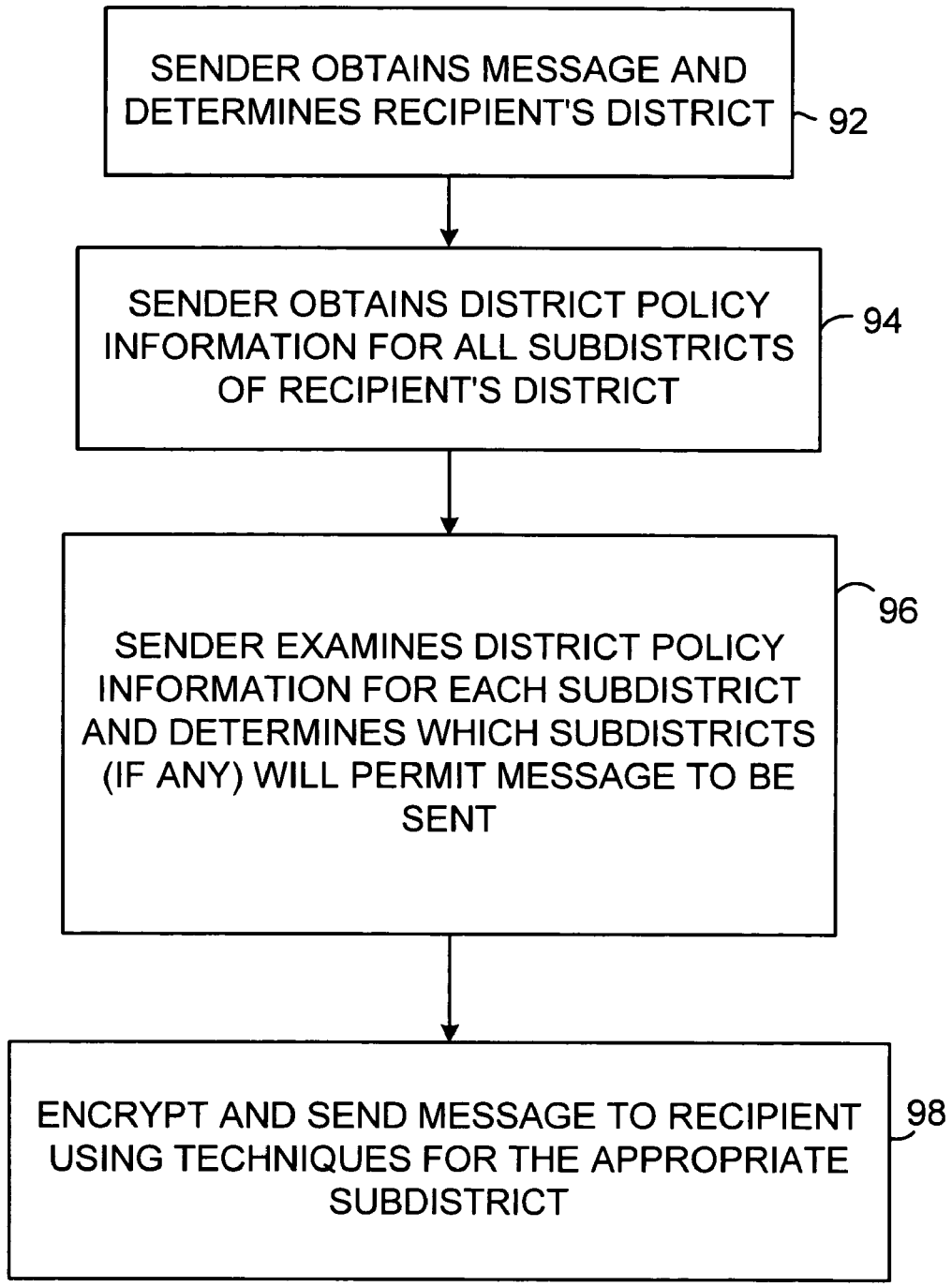
FIG. 8 is a flow chart of illustrative steps involved in sending IBE-encrypted messages in a system environment in which there are multiple subdistricts associated with a district in accordance with the present invention.

Illustrative steps involved in sending IBE-encrypted messages in an environment with multiple subdistricts are shown in FIG. 8. During these steps client 38 is used to perform messaging operations for the sender.

At step 92, a sender obtains a message and determines the recipient's district. The sender may, for example, determine the recipient's district by constructing a district service name or host name from the domain-name portion of the recipient's email address, may obtain the district in an email from the recipient, may obtain the district from a directory, etc. The sender may determine either the recipient's district or a subdistrict associated with the recipient.

At step 94, the sender obtains the district policy information for the recipient's district. The sender may, for example, obtain a copy of the list 86 of FIG. 7 or other suitable data structures containing the district policy information for each of the subdistricts in the recipient's district.

At step 96, the sender may examine the district policy information for each subdistrict and determine which subdistricts (if any) are appropriate for sending the message to the recipient. Depending on the client policy information 40 (FIG. 4), the content of the message (message information 44), and other constraints such as those imposed by the subdistrict policy information, it may or may not be possible or appropriate to send the desired message. As an example, the sender may be a doctor who wishes to send sensitive patient data to a hospital. The sender may have the message address of a desired recipient at the hospital. The sender can examine the subdistrict policy information for each subdistrict associated with the recipient to determine which (if any) subdistrict has suitable security procedures (e.g., authentication techniques, etc.) to allow the sensitive message to be sent.

If the sender is only aware of one subdistrict associated with the desired recipient, the sender may only examine the subdistrict policy information associated with that recipient. When the subdistrict policy information indicates that the requirements of the sender are satisfied, the sender may proceed to send the message using the encryption and communication techniques that are appropriate for that subdistrict and using the IBE public parameter information associated with that subdistrict (step 98).

If the sender knows only the district of the recipient, and not the subdistrict of the recipient, the sender can review the district policy information and associated recipient information (e.g., recipient information in list 86, in a directory, etc.) to determine which recipients are in each subdistrict. With this knowledge, the sender can construct a list of each of the subdistricts of which the recipient is a member. Depending on the type of message to be sent and other constraints, there may be a most appropriate subdistrict to use when sending the message to a recipient that belongs to more than one subdistrict in the district.

For example, if a message is highly sensitive, the sender may send that message to the recipient at step 98 by encrypting the message using the IBE public parameters associated with the most secure of the subdistricts with which the recipient is associated. When the recipient receives the encrypted message, the recipient will need to pass the authentication process imposed by the more secure of the subdistricts that recipient is associated with, thereby ensuring a higher degree security for the sensitive content of the message.

Figure 9:
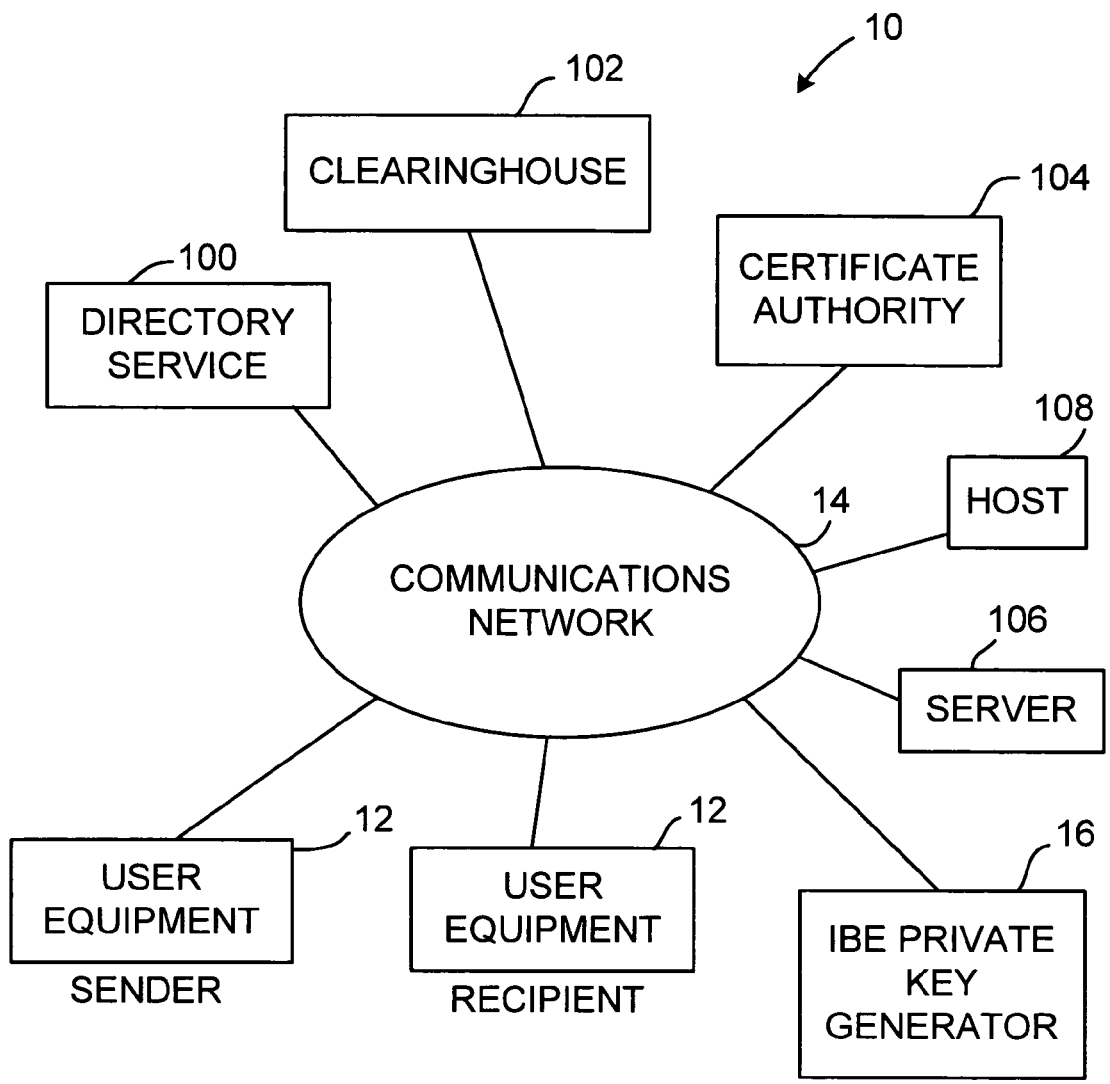
FIG. 9 is a diagram of system components that may be used to provide identity-based encryption public parameter information and/or district policy information to users in accordance with the present invention.

As described in connection with step 76 of FIG. 6, a sender who desires to send an IBE-encrypted message may obtain the IBE public parameter information and/or district policy information associated with a given recipient and the recipient's district using any suitable technique. Illustrative system components that may be used in making IBE public parameter information and/or district policy information available to a sender at equipment 12 who wishes to send an IBE-encrypted message to a desired recipient over communications network 14 are shown in FIG. 9.

With one suitable approach, a directory service 100 may be used to provide users of the system 10 with access to information that maps or associates particular groups of users with particular sets of IBE public parameters and/or district policy information. A sender who desires IBE public parameter information and/or district policy information for a given recipient or district may consult the directory service 100.

If desired, the system 10 may have multiple directory services 100, each of which maintains a directory of user information and associated IBE public parameter information and/or district policy information. A clearinghouse service 102 may be used to prevent duplication among the entries in these directories and to resolve conflicts.

Recipient identity information (e.g., email address information) may be used to look up IBE public parameter information and/or district policy information in the directories (e.g., using the domain name portion of a given recipient's email address or using a recipient's entire email address).

If the directory services are trusted, users can obtain public parameter information and district policy information from a directory service over a secure communications link (e.g., using the secure sockets layer protocol). If the directory services are not trusted (e.g., because they are operated by unknown third parties), a certificate authority 104 may be used to sign directory entries. Users can then verify the directory entries.

In configurations in which directory services are trusted, each private key generator 16 may provide directory information (e.g., information on the domain names associated with that private key generator and related information on the set of IBE public parameters and/or district policy information associated with that private key generator) to the directory services over a secure communications link. In configurations in which directory services are not trusted, the private key generators 16 may provide directory information to the directory services through a certification authority 104. The authenticity of the private key generator's directory information may be verified (by the trusted directory service or by the certification authority) before this information is published for access by users.

If desired, the unique IBE private keys of the users can be made to expire automatically. With one suitable approach, each user's identity may be made up of a time stamp concatenated with that user's email address. The privileges of a given user may be revoked by the private key generator 16 for that user's district, by refusing to generate more private keys for that given user, while continuing to generate private keys for other users.

In a system with private keys that expire on a regular basis (e.g., once per week), users will generally desire to update their private keys at the same frequency (e.g., once per week). During the weekly interchange with the private key generator 16 in the user's district to obtain a current version of a user's private key, a user may obtain updated IBE public parameter and/or district policy information for other users. This information may be provided to the user by the user's private key generator 16 at the same time that the current private key information is provided. The private key generator 16 may obtain the information on the IBE public parameters and/or district policy information from a directory service, from the private key generators 16 in other districts, from a clearinghouse 102 (e.g., in environments in which there are multiple directory services 100), from a certification authority 104 (e.g., a certification authority that is generating certificates for private key generators), or from any other suitable entity in the system 10.

The IBE public parameter information and/or district policy information for other users may be distributed to the user at the same time that the user's new private key is distributed, as part of the same transaction, at slightly different times (e.g., in related but separate messages or transmissions), or at different times in different communications and as part of separate transactions. The distribution of the IBE public parameter information and/or district policy information for other users may, with this approach, be distributed by pushing the information from each of the private key generators 16 to each other private key generator 16 and ultimately to the users 12 through their interactions with the associated private key generators 16 in their districts.

IBE public parameter information and/or district policy information for the users in system 10 may also be distributed using a peer-to-peer arrangement. For example, public parameter information and/or district policy information may be exchanged by users using email.

IBE public parameter information and/or district policy information may be provided over network 14 using a server 106. Server 106 may, for example, be associated with one or more of the entities shown in FIG. 9 such as a particular IBE private key generator, a particular directory service, etc. The server 106 may be used to distribute the IBE public parameter information and/or district policy information by email or using another suitable message format. The IBE public parameter information and/or district policy information may be provided to users from server 106 on demand (e.g., by downloading from server 106 when requested by the user or using any other suitable arrangement for providing this information to the user when the user generates a suitable request), according to a schedule, when certain criteria have been satisfied, or using any other suitable approach.

IBE public parameter information and/or district policy information may be distributed as part of a downloadable or preinstalled software module or package. For example, this information may be incorporated into an email application, web browser, or other communications or Internet application or software that is distributed with the user's personal computer or other user equipment 12 or that is downloaded (e.g., in the form of a plug-in or stand-alone package or update pack) at a later time.

The IBE public parameter information and the district policy information may be distributed together or separately. If the IBE public parameter information and the district policy information are distributed separately, the IBE public parameter information and the district policy information may be distributed using a different distribution mechanisms. For example, certain IBE public parameter information may be built into the user's software and certain district policy information may be distributed over the Internet.

If desired, public parameter information and/or district policy information may also be distributed manually. For example, IBE public parameter information and/or district policy information may be distributed by printed mail or by distributing a diskette or other computer-readable media to the user.

When there are multiple directory services 100, each directory service 100 may contain the same IBE public parameter information and/or district policy information, so that a given user need not look up directory information in different locations or with different services (or at least not many). The locations of the directory services (e.g., their URL's) may be provided to users as part of each user's identity-based encryption software, may be provided to the users separately, may be provided to the users using a combination of these techniques or any other suitable technique. The identity-based encryption software may be distributed to the user as part of equipment 12, may be downloaded as a stand-alone application or a plug-in, etc. Once the IBE public parameter information and/or district policy information has been obtained, it may be cached locally (e.g., in memory on the user's equipment 12), until it is time to update this information (e.g., to reach a user at a newly-registered private key generator).

In one suitable arrangement, directory services may be provided by a trusted organization or organizations. With this type of arrangement, each user who is accessing directory information may, because they trust the directory service, set up a secure communications channel with the directory service (e.g., using a secure key exchange arrangement as used with the secure sockets layer protocol, etc.). Once the secure communications channel has been established between the user and the trusted directory service, the user may provide the directory service with information identifying an organization or group for which the user desires IBE public parameter information and/or district policy information. The directory service may use this identifying information to determine which IBE public parameter information and/or district policy information to provide the user. The appropriate IBE public parameter information and/or district policy information may then be provided to the user over the secure communications channel.

With this approach, the directory service in effect performs a table look-up operation using the identifying information for the recipient or the recipient's district (which may be based on the recipient's email address) as an input.

If the directory services are not trusted (e.g., because they are operated by relatively unknown third parties), certificate authority 104 may be used to sign directory entries from the private key generators 16. The directory entries may be signed by the certificate authority using standard cryptographic signing techniques. With this approach, the certificate authority, rather than the directory services 100 or clearinghouse service 102 is responsible for authenticating the private key generators 16. The entries may be made to automatically expire (e.g., in a number of years) by adding an expiration date to each entry. This allows the IBE public parameter information and/or district policy information associated with each district to be kept up to date at the directory.

Any suitable technique may be used by the certification authority 104 to authenticate the private key generators 16 (e.g., techniques based on pre-shared secrets or certificates, etc.).

When there are multiple directory services 100 in system 10, the signed directory entries (certificates) may be processed by clearinghouse service 102 to avoid duplicate entries in the resulting directory tables maintained by directory services 100.

With a directory-based approach, a user who knows how to contact a directory (or clearinghouse) can use information provided by the directory to obtain IBE public parameter information and/or district policy information for a given recipient's district. If desired, there may be a different host 108 associated with each private key generator 16 for hosting the IBE public parameter information and/or district policy information from that private key generator. The host for a district may be operated by the private key generator for the district or a third party, may be co-located with other equipment for the district, may be remotely located, may be co-located with other hosts, etc.

A sender who desires to send an encrypted message to a given recipient may use the recipient's IBE public key or other recipient identity information to determine which host 108 should be contacted to obtain the appropriate IBE public parameter information and/or district policy information for that given recipient. Each host may have a service name such as a domain name or email address. The sender may use a service name generation rule and the IBE public key of the recipient, information on the recipient's district, or other recipient identity information to generate the service name of the host that is hosting the recipient's associated IBE public parameter information and/or district policy information. With one suitable service name generation rule, the sender may prepend a known string to a portion of the recipient's email address. The sender may then use the service name that has been constructed to contact the host and obtain the IBE public parameter information and/or district policy information.

To ensure the integrity of the system, senders must be able to trust the IBE public parameters and/or district policy information that they receive from hosts 108. The IBE public parameter information is therefore preferably delivered from the host servers to the senders in a secure fashion.

With one suitable approach, the sender may use the service name to establish a secure communications link with host 108. For example, the sender's email application or other suitable software on the sender's equipment may open an SSL or TLS connection by passing the service name to a domain name server on network 14 (e.g., the Internet). The domain name server includes a database (which may also be referred to as a look-up table or translation table), that associates domain names with IP addresses. Included in the domain name server's database is an entry which maps the service name of the host an IP address associated with the host server. The domain name server may be provided with this information when the host is initially set up (e.g., when the entity associated with a corresponding district's private key generator 16 is in the process of establishing the host and providing the host with the IBE public parameter information and/or district policy information).

Once the domain name server receives the service name, the domain name server can determine the IP address of the host and the IP address can be used to establish an SSL or TLS link or other secure link between the sender and the host. As part of the secure link setup process, the host server proves to the sender that the service name that the sender used to contact the host server is actually associated with that host.

With another suitable approach, the sender may receive the IBE public parameter information and/or district policy information from the host securely if the IBE public parameter information and/or district policy information is encrypted prior to delivery to the sender. With this approach, the sender may use the service name to send a message to the host that requests delivery of the IBE public parameter information and/or district policy information to the sender. Suitable network infrastructure equipment (e.g., mail servers) that the district associated with the host has provided with the necessary information on the service name of the host during set-up may be used to provide the request to the host (e.g., by routing the request message appropriately).

If desired, an insecure communications link may be used to request delivery of the IBE public parameter information and/or district policy information.

The request for the IBE public parameter information and/or district policy information that the sender provides to the host may be explicit (e.g., text or code in the request message or other request communication may specifically query the host for the IBE public parameter information and/or district policy information) or may be implicit (e.g., the host may respond to all messages or other communications that are received from users in the system 10 by providing the IBE public parameter information and/or district policy information).

In response to a request, the host may encrypt the IBE public parameter information and/or district policy information and may transmit the encrypted version of the IBE public parameter information and/or district policy information to the sender in the form of an encrypted message (e.g., for delivery over an insecure path through network 14).

To prove to the sender that the IBE public parameter information and/or district policy information that is being provided by the host is in fact from the host (and not from an unauthorized attacker), the host may have the IBE public parameter information and/or district policy information signed by certificate authority 104 prior to delivering the IBE public parameter information and/or district policy information to the sender. During the signature process, the certificate authority 104 may also sign information on the identity of the host (e.g., the host's service name), so that when the sender receives and authenticates the signed information, the sender can verify that the IBE public parameter information and/or district policy information was provided by the desired host.

The sender can verify that the IBE public parameter information and/or district policy information is correct by comparing the host information that has been signed by the trusted certificate authority with information that the sender has on the expected host name (e.g., information on the host server's expected identity that the sender has gathered from the domain name portion of the service name or the rule-generated service name itself). If it is determined that the IBE public parameter information and/or district policy information was provided by an authorized host, the sender can accept the IBE public parameter information and/or district policy information for use in encrypting messages to the recipient.

These are merely illustrative techniques for providing the IBE public parameter information and district policy information in an identity-based encryption system to senders. Any suitable technique for providing this information to senders may be used if desired.

The foregoing is merely illustrative of the principles of this invention and various modifications can be made by those skilled in the art without departing from the scope and spirit of the invention.

What is claimed is:

1. A method for controlling communications in an identity-based encryption (IBE) system in which senders communicate with recipients over a communications network and in which recipients and IBE private key generators are organized in a plurality of districts, each district including a respective one of the IBE private key generators, wherein the IBE private key generator in each district generates IBE private keys for recipients that are associated with that district, wherein each district has IBE public parameter information that is used by senders in encrypting messages for recipients in that district, wherein each district has district policy information that includes IBE encryption protocol information, and wherein the recipients in each district use their IBE private keys in decrypting messages that are encrypted using respective IBE public keys, comprising:

when a sender desires to send a message to a recipient in a given district, obtaining the district policy information for the given district for the sender over the communications network, wherein the district policy information that is obtained for the given district includes IBE encryption protocol information for the given district that specifies an IBE public key format that is to be used in creating IBE public keys for the recipients in the given district;

at the sender, using the IBE public key format specified by the IBE encryption protocol information to construct an IBE public key for the recipient in the given district; and at the sender, encrypting the message for the recipient using the IBE public parameter information associated with the given district and the IBE public key that has been constructed for the recipient according to the IBE public key format.

2. The method defined in claim 1 further comprising using the district policy information to determine whether to send the message to the recipient.

3. The method defined in claim 1 further comprising using the district policy information and client policy information to determine whether to send the message to the recipient.

4. The method defined in claim 1 further comprising using the district policy information to determine how to send the message to the recipient.

5. The method defined in claim 1 wherein the recipient has a username and wherein the IBE encryption protocol information includes IBE public key format information that specifies which portion of the recipient's username is used to form the IBE public key, the method comprising using the IBE public key format information that specifies which portion of the recipient's username is used to form the IBE public key at the sender to construct the IBE public key from the recipient's username.

6. The method defined in claim 1 wherein the district policy information for the given district includes communications protocol information that specifies which communications protocols are used by the given district, the method comprising using the communications protocol information at the sender to determine which communications protocols are being used by the given district.

7. The method defined in claim 1 wherein the district policy information for the given district includes communications protocol information that specifies which communications protocols are used by the given district, the method comprising using the communications protocol information at the sender to determine which message format is being used by the given district.

8. The method defined in claim 1 wherein the district policy information includes authentication protocol information that specifies what type of authentication is required before the IBE private key generator for the given district provides IBE private keys to recipients in the given district, the method comprising using the authentication protocol information at the sender in sending the message to the recipient.

9. The method defined in claim 1 wherein the district policy information includes authentication protocol information that specifies what type of authentication is required before the IBE private key generator for the given district provides IBE private keys to recipients in the given district, the method comprising using the authentication protocol information at the sender to determine whether to send the message to the recipient.

10. The method defined in claim 1 wherein the district policy information includes authentication protocol information that specifies what type of authentication is required before the IBE private key generator for the given district provides IBE private keys to recipients in the given district, the method comprising using the authentication protocol information at the sender to determine whether the recipient uses a smart card when being authenticated by the IBE private key generator.

11. The method defined in claim 1 wherein the district policy information includes content-based protocol information that specifies how messages for recipients in the given district are to be handled based on their content, the method comprising using the content-based protocol information at the sender to determine whether to send the message to the recipient in the given district.

12. The method defined in claim 1 wherein the given district comprises multiple subdistricts, each of the multiple subdistricts having its own respective subdistrict IBE private key generator, wherein the recipient is associated with at least one of the subdistricts, and wherein each subdistrict has associated subdistrict policy information, the method further comprising:
    at the sender, obtaining the subdistrict policy information for each of the multiple subdistricts; and
    at the sender, using the subdistrict policy information for the multiple subdistricts in sending the message to the recipient.

13. The method defined in claim 1 wherein the given district comprises multiple subdistricts, each of the multiple subdistricts having its own respective subdistrict IBE private key generator, wherein the recipient is associated with more than one of the subdistricts, and wherein each subdistrict has associated subdistrict policy information, the method further comprising:
    at the sender, obtaining the subdistrict policy information for each of the multiple subdistricts; and
    at the sender, using the subdistrict policy information for the subdistricts with which the recipient is associated in determining which subdistrict to send the message to.

14. The method defined in claim 1 wherein the given district comprises multiple subdistricts, each of the multiple subdistricts having its own respective subdistrict IBE private key generator, wherein the recipient is associated with more than one of the subdistricts, wherein the subdistricts use different techniques for authenticating recipients, wherein each subdistrict has associated subdistrict policy information that specifies the techniques used for authenticating their recipients, the method further comprising:
    at the sender, obtaining the subdistrict policy information for each of the multiple subdistricts; and
    at the sender, using the subdistrict policy information for those subdistricts with which the recipient is associated in determining which of those subdistricts to send the message to based on which technique is used to authenticate the recipient at each of those subdistricts.

15. The method defined in claim 1
    wherein the message has certain message content the method further comprising:
    at the sender, determining whether to send the message to the recipient based on the message content and the district policy information.

16. The method defined in claim 1 further comprising:
    at the sender, using the district policy information to determine whether to display a notice for the sender.

17. The method defined in claim 1 further comprising providing the district policy information to the sender in the form of a district policy information list containing an identifier for each list entry.

18. The method defined in claim 1 further comprising providing the district policy information to the sender in the form of a district policy information list having list entries, wherein at least some of the list entries are digitally signed.

19. A method for controlling communications in an identity-based encryption (IBE) system in which senders communicate with recipients over a communications network and in which recipients and IBE private key generators are organized in a plurality of districts, each district including a respective one of the IBE private key generators, wherein the IBE private key generator in each district generates IBE private keys for recipients that are associated with that district, wherein each district has IBE public parameter information that is used by senders in encrypting messages for recipients in that district, wherein each district has district policy information that includes IBE encryption protocol information, and wherein the recipients in each district use their IBE private keys in decrypting messages that are encrypted using respective IBE public keys, comprising:
    when a sender desires to send a message to a recipient in a given district, obtaining the district policy information for the given district for the sender over the communications network, wherein the district policy information that is obtained for the given district includes authentication protocol information for the given district that specifies what type of authentication is required before the IBE private key generator for the district provides IBE private keys to recipients in the district;
    at the sender, using the authentication protocol information for the given district to determine whether to send the message to the recipient in the given district; and
    at the sender, if it is determined that the message is to be sent to the recipient in the given district, encrypting the message for the recipient using the IBE public parameter information associated with the given district and an IBE public key of the recipient and sending the message to the recipient.

20. A method for controlling communications in an identity-based encryption (IBE) system in which senders communicate with recipients over a communications network and in which recipients and IBE private key generators are organized in a plurality of districts, each district including a respective one of the IBE private key generators, wherein the IBE private key generator in each district generates IBE private keys for recipients that are associated with that district, wherein each district has IBE public parameter information that is used by senders in encrypting messages for recipients in that district, wherein each district has district policy information that includes IBE encryption protocol information, and wherein the recipients in each district use their IBE private keys in decrypting messages that are encrypted using respective IBE public keys, comprising:

when a sender desires to send a message to a recipient in a given district, obtaining the district policy information for the given district for the sender over the communications network, wherein the district policy information that is obtained for the given district includes IBE message format information that specifies at least one IBE message format that is supported by the given district;

at the sender, using the IBE message format specified by the IBE message format information to construct the message for the recipient in the given district; and at the sender, encrypting the message for the recipient using the IBE public parameter information associated with the given district and an IBE public key for the recipient and sending the message to the recipient.

21. A method for controlling communications in an identity-based encryption (IBE) system in which senders communicate with recipients over a communications network and in which recipients and IBE private key generators are organized in a plurality of districts, each district including a respective one of the IBE private key generators, wherein the IBE private key generator in each district generates IBE private keys for recipients that are associated with that district, wherein each district has IBE public parameter information that is used by senders in encrypting messages for recipients in that district, wherein each district has district policy information that includes IBE encryption protocol information, and wherein the recipients in each district use their IBE private keys in decrypting messages that are encrypted using respective IBE public keys, comprising:

when a sender desires to send a message to a recipient in a given district, obtaining the district policy information for the given district for the sender over the communications network, wherein the district policy information that is obtained for the given district includes content-based protocol information for the given district that specifies how the given district handles messages depending on their content;

at the sender, using the content-based protocol information for the given district to determine whether to send the message to the recipient in the given district; and at the sender, if it is determined that the message is to be sent to the recipient in the given district, encrypting the message for the recipient using the IBE public parameter information associated with the given district and an IBE public key of the recipient and sending the message to the recipient.

* * * * *